US007557312B2

(12) United States Patent
Clark et al.

(10) Patent No.: US 7,557,312 B2
(45) Date of Patent: Jul. 7, 2009

(54) KEYBOARD ASSEMBLY

(75) Inventors: James T Clark, Spokane, WA (US); Mitchell S Butzer, Coeur d'Alene, ID (US); Lee B Snow, Post Falls, ID (US); Richard B Lawrence, Hayden, ID (US); Cody G Peterson, Coeur d'Alene, ID (US)

(73) Assignee: Advanced Input Devices, Inc., Coeur d'Alene, ID (US)

( * ) Notice: Subject to any disclaimer, the term of this patent is extended or adjusted under 35 U.S.C. 154(b) by 552 days.

(21) Appl. No.: 11/351,568

(22) Filed: Feb. 10, 2006

(65) Prior Publication Data

US 2006/0180450 A1    Aug. 17, 2006

Related U.S. Application Data

(60) Provisional application No. 60/654,527, filed on Feb. 17, 2005, provisional application No. 60/691,374, filed on Jun. 17, 2005, provisional application No. 60/748,886, filed on Dec. 8, 2005.

(51) Int. Cl.
*H01H 13/70* (2006.01)
(52) U.S. Cl. .................. 200/5 A; 345/168
(58) Field of Classification Search ............ 200/5 A, 200/517, 308, 310, 314, 317, 302.1, 302.2, 200/302.3, 333; 361/680; 341/22; 345/168–172; 400/472, 496, 477, 479, 491.3, 714
See application file for complete search history.

(56) References Cited

U.S. PATENT DOCUMENTS 4,352,968 A    10/1982  Pounds
4,365,120 A *  12/1982  Pounds ..................... 200/5 A
5,021,638 A *   6/1991  Nopper et al. ........... 235/145 R
5,080,155 A *   1/1992  Crozier .................... 150/154
5,092,459 A *   3/1992  Uljanic et al. ............ 206/320
5,096,317 A *   3/1992  Phillippe .................. 400/714
5,253,142 A    10/1993  Weng
5,500,655 A *   3/1996  Isawa et al. .............. 345/168
5,519,569 A     5/1996  Sellers
5,527,122 A *   6/1996  Carter ..................... 400/496
5,551,497 A *   9/1996  Stanley ................... 150/154
5,602,715 A     2/1997  Lempicki et al.
5,612,520 A     3/1997  Toedtman et al.
5,757,271 A *   5/1998  Andrews ................ 340/568.1
5,917,005 A     6/1999  Brunelle et al.
6,374,145 B1 *  4/2002  Lignoul .................... 700/17
6,401,209 B1 *  6/2002  Klein ....................... 726/34
6,437,972 B1    8/2002  Sellers
6,596,953 B2    7/2003  Chu
6,705,787 B2 *  3/2004  Jeffries et al. ............ 400/714
6,796,675 B2    9/2004  Galli
6,834,975 B2   12/2004  Chu-Chia et al.
6,887,002 B1 *  5/2005  Chen ....................... 400/490
7,056,042 B2 *  6/2006  Pihlaja .................... 400/472
7,157,655 B1 *  1/2007  Murzanski ............... 200/302.2

\* cited by examiner

*Primary Examiner*—Michael A Friedhofer
(74) *Attorney, Agent, or Firm*—Christensen O'Connor Johnson Kindness PLLC

(57) ABSTRACT

A keyboard assembly is provided. The keyboard assembly includes a keyboard having at least one input key assembly positioned within the housing and an infection controllable apparatus attached thereto.

33 Claims, 20 Drawing Sheets

KEYBOARD ASSEMBLY

CROSS-REFERENCES TO RELATED APPLICATIONS

This application claims the benefit of U.S. Provisional Patent Application No. 60/654,527, filed Feb. 17, 2005; U.S. Provisional Patent Application No. 60/691,374, filed Jun. 17, 2005; and U.S. Provisional Patent Application No. 60/748,886, filed Dec. 8, 2005, the disclosures of which are all hereby expressly incorporated by reference.

TECHNICAL FIELD

The presently claimed subject matter relates generally to data input or signal generating devices and more specifically to data input or signal generating devices such as keyboard assemblies, having a cleanable top surface.

BACKGROUND

Generally described, a wide variety of keyboards are utilized for signal generating functions, generating data entry terminals, and remote control terminals. Typically, each key of each key assembly of the keyboard corresponds to a particular alphanumeric, such as a specific numeral, character, letter, or operation. Often the key assemblies are complex in construction and operate not only to make switch contact, but to provide an operator with a tactile sensation or feedback. Such key assemblies employ a wide variety of structures ranging from spring loaded switches to dome-type switches to provide this tactile feedback signal.

Although the above-described keyboards are effective for data entry, they offer a distinct disadvantage in that they are a source susceptible to the spreading of infectious agents, resulting in the contamination or infection of the user. Moreover, the keyboards include numerous crevices where grime and infectious agents can reside. Further, these crevices, such as the area between adjacent keys, make the keyboard hard and/or impractical to clean, since a cleaning cloth or tool may be difficult or impossible to operate between adjacent keys and any cleaning solvent used may pass between adjacent keys and contact the electronics of the keyboard, thus damaging the keyboard.

Keyboards are frequently used in work areas in the presence of infectious germs and other hazardous materials. Keyboards and other equipment in these environments often must be cleaned at regular intervals to reduce the risk of spreading disease and infection. These cleaning intervals can be set to a variety of conditions, including a predetermined period of time or a defined amount of equipment usage.

To facilitate cleaning, membrane keyboards have been developed that incorporate a substantially smooth top. Although previously developed membrane keyboards help reduce the spread of infectious diseases by providing a cleanable top surface, they are not without their problems. For instance, currently available membrane keyboards generally include key assemblies of a high actuation force and low travel length type. More specifically, actuation force is the force required to transition a key of the key assemblies from a normally raised position to a depressed position in which a signal is generated. Actuation forces are typically divided into two classifications: low actuation forces and high actuation forces. A low actuation force is generally characterized as less than about 0.3 lbf. Conversely, a high actuation force is generally characterized to be more than about 0.3 lbf.

The term "travel length" refers to the distance that the key is moved between the raised position and the depressed position. Travel lengths are typically divided into three classifications: low travel; medium travel; and full travel. Low travel is for keys which travel less than about 0.02 inches between their raised position and their depressed position. Medium travel is for keys which travel between about 0.02 inches to about 0.06 inches between their raised position and their depressed position. Full travel is for keys which travel more than about 0.06 inches between their raised position and their depressed position.

As previously developed cleanable keyboards do not have a way to alert users that the keyboard requires cleaning, the burden is on the user to keep track of the scheduled cleaning intervals. Furthermore, because the previously developed cleanable membrane style keyboards having key assemblies of the high actuation force and low travel length type, they are not suitable for touch typing (i.e., typing performed on a keyboard having key assemblies of a low actuation force and medium-to-full travel type such that a user can type with relatively no fatigue and with positive feedback of switch contact), which is preferred in most data entry terminals. Since previously developed cleanable membrane style keyboards are not touch-type keyboards, a user is unable to type for long periods of time without looking at the keyboard and/or without experiencing fatigue in his or her hands.

SUMMARY

A combination keyboard and cover assembly constructed in accordance with one embodiment of the present invention is provided. Such a keyboard and cover assembly includes a keyboard having at least one input key assembly positioned within the housing and a cover. The cover is sized and configured to substantially incase the keyboard and has a substantially flat top surface to resist wrinkling during use. The cover also includes a predetermined flexibility to substantially mechanically isolate one input key assembly from a second input key assembly during a key stroke input travel distance of at least 0.05 inches.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DRAWINGS

The foregoing aspects and many of the attendant advantages of the presently claimed subject matter will become better understood by reference to the following detailed description, when taken in conjunction with the accompanying drawings, wherein:

DETAILED DESCRIPTION

Figure 1:
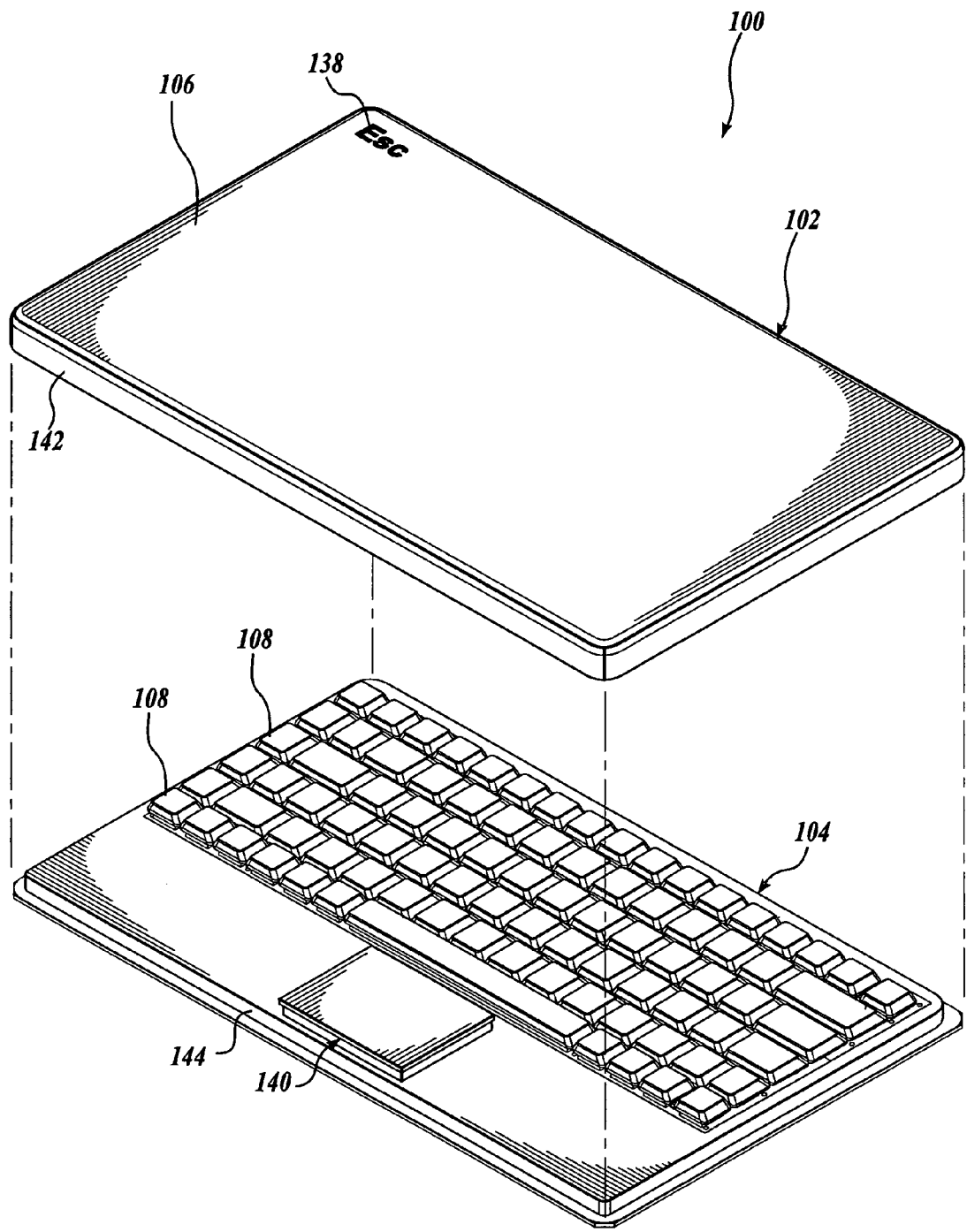
FIG. 1 is a partially exploded perspective view of a keyboard assembly formed in accordance with one embodiment of the presently claimed subject matter showing a keyboard cover removed from a keyboard.

The presently claimed subject matter is described herein with reference to the accompanying illustrations where like numerals correspond to like elements. One suitable embodiment of a keyboard assembly 100, constructed in accordance with the presently claimed subject matter is illustrated in FIGS. 1-6. The keyboard assembly 100 includes a plurality of input key assemblies 108 disposed within a housing to form a keyboard 104. Such a keyboard assembly 100 can be used in combination with any conventional system, such as a computer, word processor, calculator, data entry terminal, control panel and the like, to generate signals and/or to enter data into the system.

For clarity in the following description, directional terms such as vertical, horizontal, downwardly, upwardly, etc., have been used to describe one suitable embodiment of the keyboard assembly 100, wherein the key assemblies 108 are mounted on a horizontal plane and extend away from the plane in an upward manner. However, it will be appreciated that the keyboard assembly 100 may be mounted in any orientation, and thus, the directional terms will change accordingly. Therefore, such terms should be viewed as merely descriptive and non-limiting.

The keyboard assembly 100 includes a cover 102 removably coupled to the keyboard 104. The cover 102 has a substantially smooth top surface 106, which is substantially free of crevices so as to be amenable to cleaning. In one embodiment, the cover 102 is substantially free of features on the top surface 106 which exceed a selected depth or height from the top surface 106, such as about 0.02 inches, 0.015 inches, 0.010 inches, or 0.005 inches. Preferably, these features are subtle and localized features either convex or concave in shape so as to have smooth transitions amenable to cleaning, for example, by wiping with a cloth. In another embodiment, the cover 102 is substantially free of crevices such that a cloth can pick up foreign material, such as germs, with a simple wiping action.

When assembled, the cover 102 is disposed over, or encases, the key assemblies 108. To actuate the key assemblies 108 underlying the cover 102, a user types upon the cover 102. The key assemblies 108 are preferably medium-to-full travel key assemblies requiring low actuation forces to permit a user to use the keyboard assembly 100 in a touch-type manner. The cover 102 may be removed and cleaned, or alternately, cleaned when disposed over or encasing the key assemblies 108, to reduce the spread of infectious diseases.

In light of the above general description of the keyboard assembly 100, the components of the keyboard assembly 100 will now be described in greater detail. The keyboard 104, as stated above, includes a plurality of key assemblies 108. The key assemblies 108 are of any suitable design that is currently known or to be developed in the future, a few suitable examples being elastomeric tactile style key assemblies, metal dome style key assemblies, elastomeric dome style key assemblies as shown and described, or spring loaded style key assemblies. For the purposes of this detailed description, the term "dome" refers to domes having a semi-spherical shape as well as domes of any other geometric shape.

Figure 4:
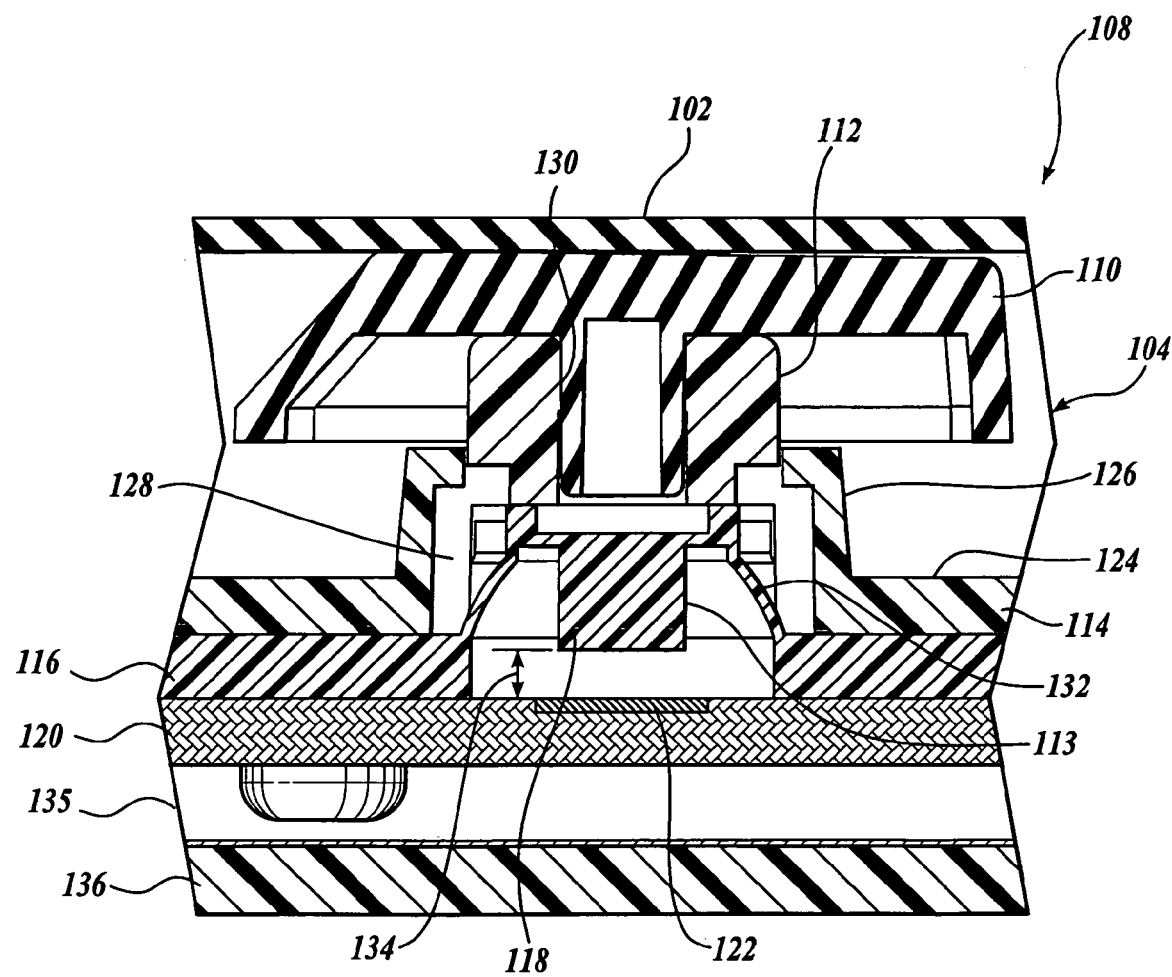
FIG. 4 is a partial cross-sectional planar view of a portion of the keyboard assembly of FIG. 3 showing one key assembly of the keyboard assembly in a raised position.

Referring to FIG. 4, while only one of the key assemblies 108 will be described in detail for the sake of brevity, those skilled in the art will appreciate that the description of the single key assembly 108 pertains equally well to the other key assemblies 108 of the keyboard assembly 100. In that regard, the key assembly 108 of FIG. 4 includes a moveable key 110, a plunger 112, a key support structure 114, an actuation layer 116, and a switch contact 118. The key assembly 108 is disposed above a switch layer 120 having a switch layer contact 122.

Figure 5:
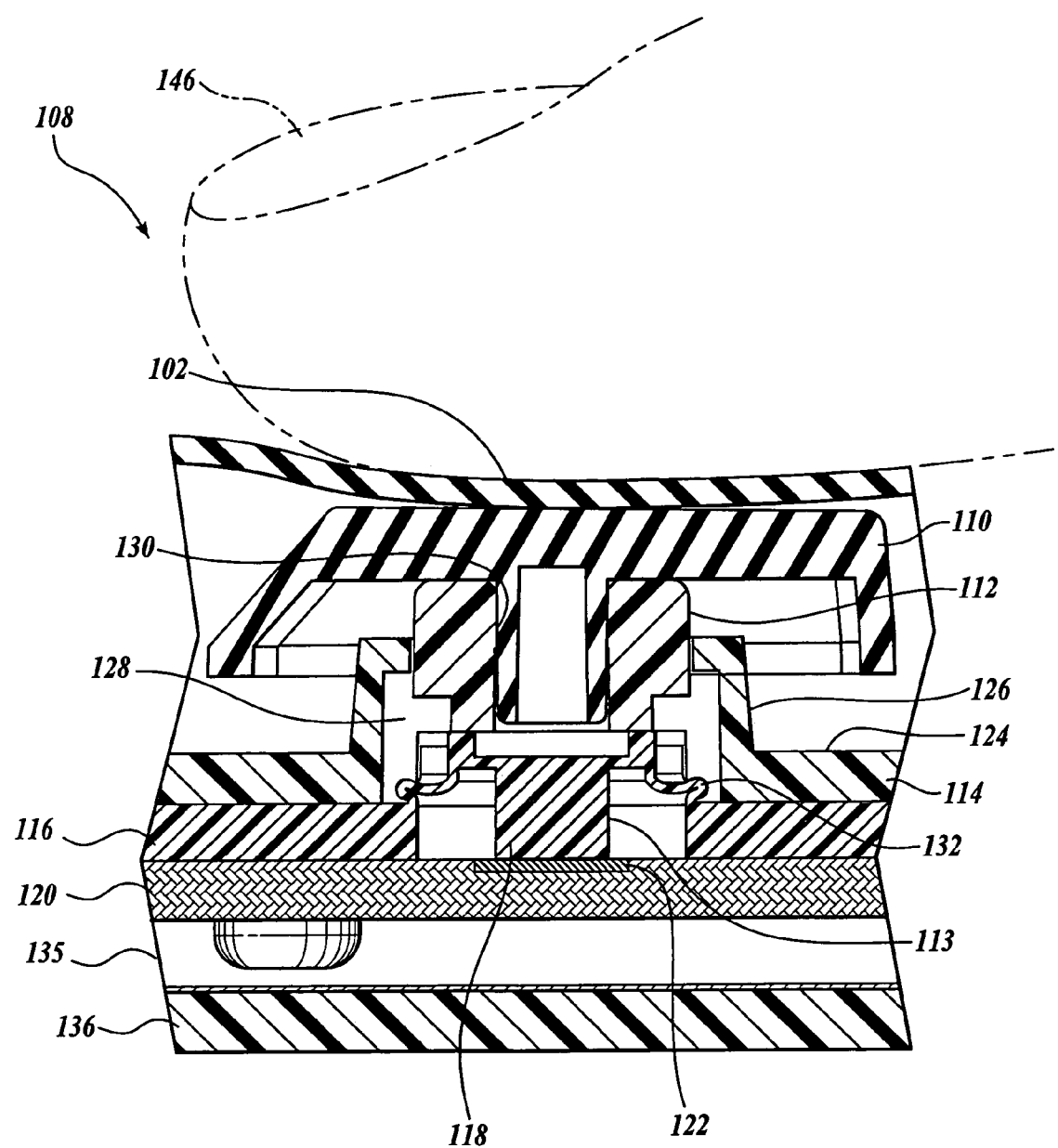
FIG. 5 is a partial cross-sectional view of the key assembly of FIG. 4 showing the key assembly in a depressed position.

During use, when a user applies a downward force on the moveable key 110 equaling or exceeding the actuation force of the key assembly 108, the moveable key 110 moves from its raised position (as shown in FIG. 4) toward the switch layer 120 to a depressed position (as shown in FIG. 5). This depressed position results in switch closure. Specifically, the switch contact 118 of the moveable key 110 electrically contacts the electrical contact of the switch layer contact 122, as shown in FIG. 5. Such switch closure results in the generation of a signal, and optionally, an associated data entry.

During movement of the moveable key 110, the key support structure 114 supports the moveable key 110 and guides the moveable key 110 along a vertical axis of the key assembly 108. After the actuation force is removed from the moveable key 110, the actuation layer 116 returns the moveable key 110 to the raised position shown in FIG. 4.

Still referring to FIG. 4, each individual element of the key assembly 108 will now be described in detail, beginning with the key support structure 114. The key support structure 114 is adapted to support and guide the moveable key 110 when the moveable key 110 is pressed and released. In the embodiment shown, the key support structure 114 is constructed in the form of a bezel housing that includes a base plate 124 having upwardly extending side walls 126. The side walls 126 extend from the base plate 124 to form a hollow key silo 128.

At least partially disposed in the hollow key silo 128 is the plunger 112. The plunger 112 includes a vertically disposed bore 130 extending therethrough. The bore 130 forms a socket for receiving a shaft of the moveable key 110 to couple the moveable key 110 to the plunger 112, for example, in an interference fit relationship. While the moveable key 110 is described above and illustrated as being a separable part from the plunger 112, it will be readily evident that the moveable key 110 and the plunger 112 may alternately be integrally formed as a unitary member.

The plunger 112 is disposed in sliding arrangement within the side walls 126 of the key support structure 114. In one embodiment, the plunger 112 is preferably keyed to the key support structure 114 so that the moveable key 110 is impeded from rotating relative to the key support structure 114. The key support structure 114 may be of a unitary construction, preferably made from a semi-rigid, or rigid material, one suitable example being a polycarbonate material.

The actuation layer 116 is constructed out of an elastomeric material, such as silicon rubber, and is disposed directly below the key support structure 114 and substantially parallel to the base plate 124. The actuation layer 116 may be of a unitary construction integrally formed with a depressible dome 132, the dome 132 being associated with the moveable key 110.

In the embodiment shown, the depressible dome 132 is generally circular in cross-section and of a suitable size such that the dome 132 provides a generally uniform upward force and uniform support for its associated moveable key 110 across the entire bottom surface of the moveable key 110.

The upward force, or biasing force, which the depressible dome 132 applies to the moveable key 110 maintains the moveable key 110 in the raised position until a user applies an actuation force which overcomes the biasing force, resulting in the downward movement of the moveable key 110 to the depressed position. In the illustrated embodiment, the force of actuation required to transition the moveable key 110 from the raised position to the depressed position is selected such that the key assembly 108 is suitable for touch-typing. For instance, in one embodiment, the key assembly 108 is a low actuation force key assembly 108, having an actuation force less than any one of the following forces: about 0.3 lbf, 0.2 lbf, 0.1 lbf, 0.08 lbf, or 0.06 lbf. Preferably, the actuation force of the key assemblies 108 is between about 0.1 lbf and about 0.2 lbf.

When the moveable key 110 is depressed, the bottom surface of the moveable key 110 presses downwardly, equally and symmetrically, on the depressible dome 132 so that the dome 132 flexes or deforms downwardly and uniformly around its entire cross-section as shown in FIG. 5. The depressible dome 132 includes an electrically conductive contact 118 mounted on the bottom surface of an extension 113 of the dome 132, facing the switch layer 120.

In the embodiment shown, the electrically conductive contact 118 is a unitary member extending the entire width of the bottom of the extension 113. Alternatively, the contact 118 can be made up of a plurality of smaller dimensioned contacts disposed around the perimeter of the bottom surface of the extension 113. In operation, the contact 118 contacts an associated electrical contact 122 on the switch layer 120 when the depressible dome 132 is sufficiently depressed by the moveable key 110 to produce the desired switching effect and associated data entry.

In the illustrated embodiment, the length of travel 134 of the moveable key 110 from its raised position to its depressed position is selected such that the key assembly 108 is suitable for touch-typing. For instance, in one embodiment, the key assembly 108 is a medium travel or a full travel key assembly 108, having a length of travel 134 greater than any one of the following: about 0.05 inches, about 0.06 inches, about 0.08 inches, about 0.10 inches, about 0.12 inches, about 0.14 inches, about 0.16 inches, about 0.18 inches, about 0.20 inches, or about 0.22 inches. Preferably, the travel length 134 of the key assemblies 108 is between about 0.06 inches and about 0.16 inches.

Still referring to FIG. 4, the key assembly 108 further includes the switch layer 120, a spacer layer 135, and a base layer 136, all of which are parallel to and disposed directly below the actuation layer 116. The switch layer 120 may be a well-known printed circuit board and may be carbon coated to prevent corrosion. In addition, the switch layer may be formed by any conventional method, such as a copper cladding process or a printed silver ink process. The spacer layer 135 suspends the switch layer 120 above the base 136, the base 136 forming a bottom of a housing of the keyboard 104.

Figure 6:
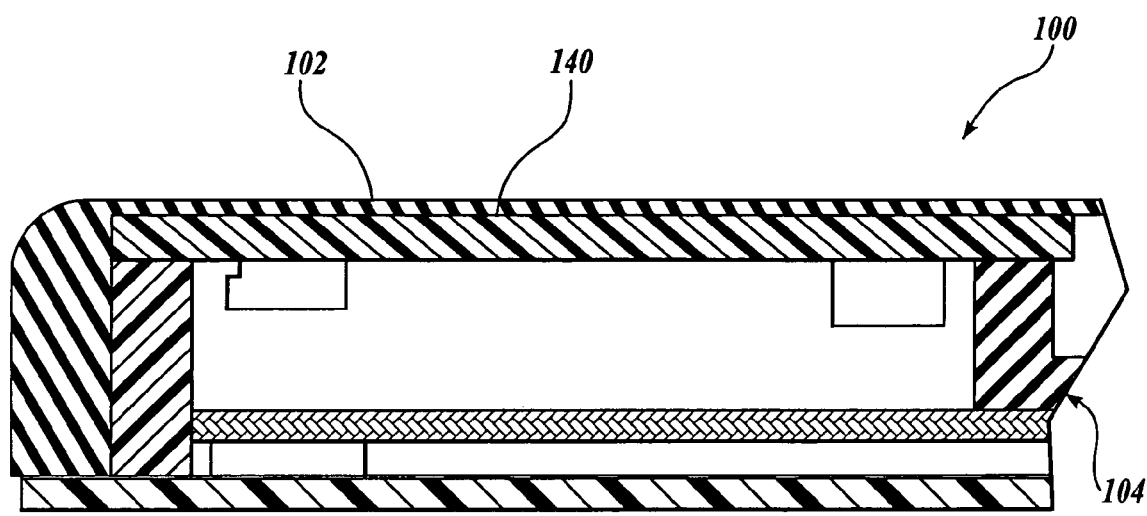
FIG. 6 is a partial cross-sectional view of a portion of the keyboard assembly of FIG. 3 showing a touch pad of the keyboard assembly.

Referring to FIG. 6, the keyboard 104 may also include a well-known touchpad 140. The touchpad 140 detects and tracks finger motion above the touchpad 140. To move a cursor associated with the user's finger disposed above the touchpad 140, the user lightly slides his or her finger over the portion of the cover 102 disposed above the touchpad 140 surface. The touchpad 140 translates the finger's location above the touchpad 140 into cursor movement.

Referring to FIG. 1, the cover 102 will now be described in greater detail. The cover 102 includes a substantially smooth top surface 106 which is substantially free of crevices so as to be amenable to cleaning, as mentioned briefly above. Extending perpendicular downward about a perimeter of the top surface 106 is a sidewall 142. The sidewall 102 is adapted to fit about a shoulder 144 of the keyboard 104, preferably in an interference fit relationship, thereby removably coupling the cover 102 to the keyboard 104. Although the cover 102 is illustrated and described as being removably coupled to the keyboard 104, it should be appreciated by those skilled in the art that the cover 102 may also be integrally formed or permanently attached to the keyboard 104.

The cover 102 is made from a flexible material such that the cover 102 may deform when pressure is applied to it to reciprocate the moveable key between its normally raised position and the depressed position. The cover 102 is formed from a material that is able to deflect or stretch like a trampoline during use so that the key assembly 108 disposed below the cover 102 can actuate with very little to no extra resistance caused by the cover 102. For instance, the cover 102 may be made from a flexible material that increases the actuation force of a low actuation force, medium-to-full travel key assembly by less than any one of the following values:

about 50%, 40%, 30%, 20%, 10%, or 5%. In a preferred embodiment, the flexible material increases the actuation force of the key assembly by less than 25%.

The cover 102 is preferably made from a flexible material with a predetermined flexibility to substantially mechanically isolate one key assembly 108 from the other key assemblies 108 during use. In that regard, the flexibility of the material permits a user to press the cover 102 in one location to activate a selected key assembly 108 without activating any adjacent key assemblies 108.

Although the cover 102 has a predetermined flexibility to substantially mechanically isolate one key assembly 108 from the other key assemblies 108 during use, it should be appreciated that some compression of adjacent key assemblies 108 may occur when one key assembly 108 is sufficiently depressed by an actuation force to be actuated, thus resulting in a desired switching effect and associated data entry. However, such adjacent compression is generally insufficient to actuate the adjacent key assemblies 108 (i.e., to produce a desired switching effect and associated data entry by the adjacent key assemblies 108).

In one embodiment, the material of the cover 102 is of a selected flexibility permitting low actuation force, medium-to-full travel key assemblies of a standard keyboard, for example, located on a ¾" center to center spacing, to be individually actuated from the raised position to the depressed position without causing adjacent key assemblies to also be actuated. In another embodiment, a top layer of the cover 102 has a thickness substantially between about 0.01 inches and about 0.2 inches. In another embodiment, the top layer has a thickness substantially between about 0.02 inches and about 0.08 inches, with a preferred value of about 0.031 inches.

One suitable material for constructing the cover 102 is an elastomer that resists wrinkling when coupled to the keyboard, such as a silicone elastomer. In one embodiment, the cover 102 is made of an elastomer having a durometer rating substantially between about 20 and about 40, with a preferred rating of about 30. In another embodiment, the cover 102 is formed from a soft urethane material or any other material that can be stretched and which is then able to return to its original configuration.

The cover 102 may include one or more protective coatings added to the top surface 106 to resist contaminants from being absorbed into the elastomer and resist degradation of the elastomer by an adverse chemical reaction. The cover 102 may also include protective coatings added to impede the growth of infectious material upon the cover 102, such as antibacterial based coatings. The cover 102 may be formed from a translucent, transparent, or opaque material, or any combination thereof, to permit the key assemblies 108 to be visible through the cover with substantial clarity.

The cover 102 may further include indicia 138 disposed on the cover 102 to indicate to a user the alphanumeric associated with the key assemblies 108 disposed below the indicia. The indicia 138 may be visual or physical in nature, such as text printed on the cover 102, an outline of an outer perimeter of the key assemblies 108 disposed below the indicia, a change in the texture of the cover 102, slight indentation(s) on the cover 102, and/or raised structure(s) on the cover 102.

Such indentations or raised structures may be convex or concave in shape so as to be free of crevices, and such indentations or raised structures may or may not resemble the alphanumerics associated with the key assemblies 108. It should be appreciated that printed indicia may be negatively illuminated (the indicia is opaque and the surrounding area is transparent or translucent) or positively illuminated (the indicia is transparent or translucent and the surrounding area opaque).

In the illustrated embodiment, one suitable indicia 138 is shown as the letters "ESC" printed, indented, or raised upon the cover 102 and disposed over the key assembly 108 associated with an escape operation of a computer (not shown) coupled to the keyboard 104. Although only a single indicia 138 is shown in the illustrated embodiment for purposes of clarity, it should be appreciated by those skilled in the art that the cover 102 may include multiple indicia 138, such as one for every key assembly 108, or a lesser number, such as indicia 138 disposed above selected reference keys, such as above the keys associated with characters "F" and "J" in a standard English (or QWERTY) keyboard.

Figure 2:
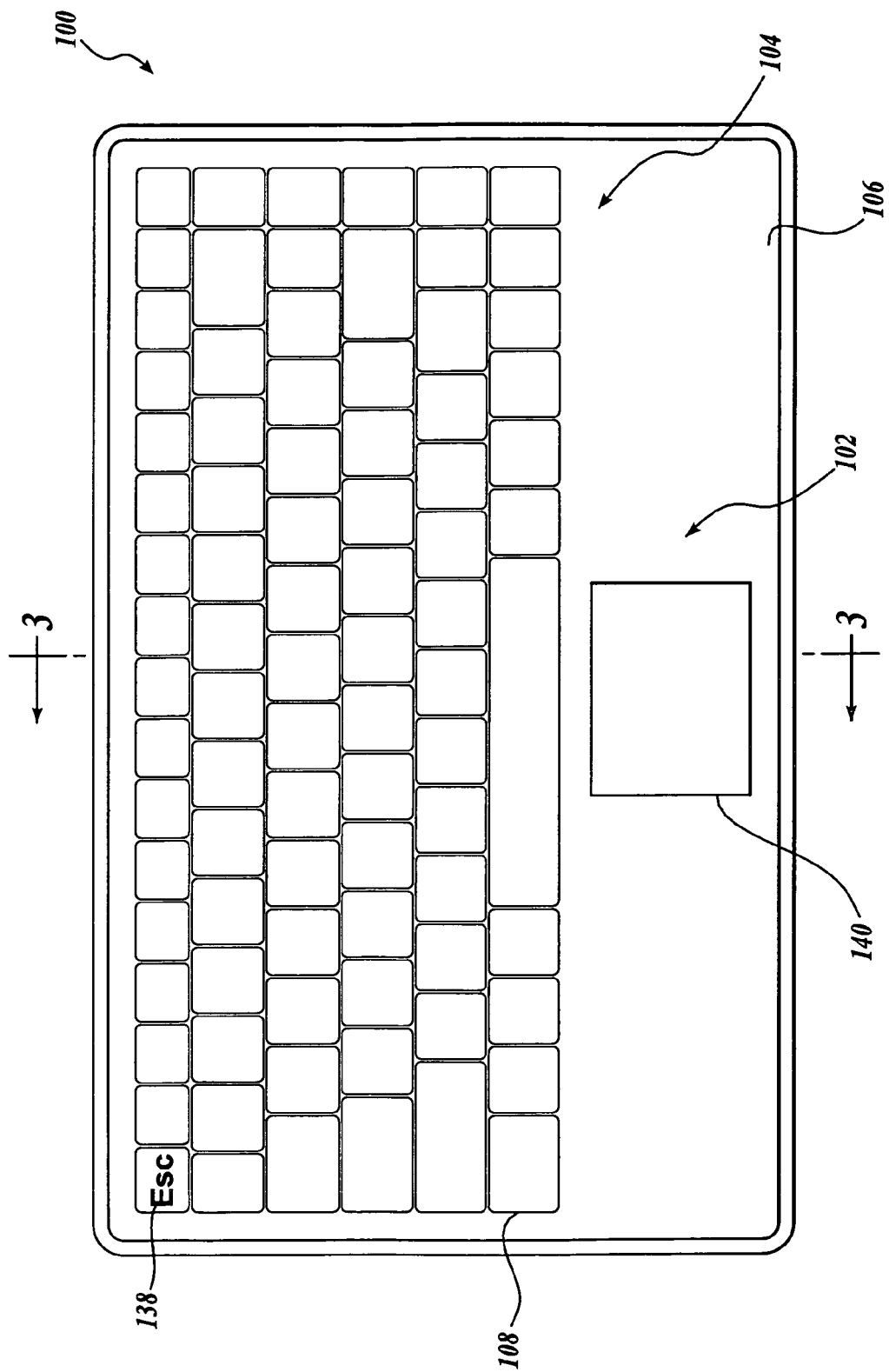
FIG. 2 is a top planar view of the keyboard assembly of FIG. 1 showing the keyboard cover disposed over the keyboard, the keyboard cover being sufficiently translucent to permit a user to view the keyboard disposed below the keyboard cover.
Figure 3:
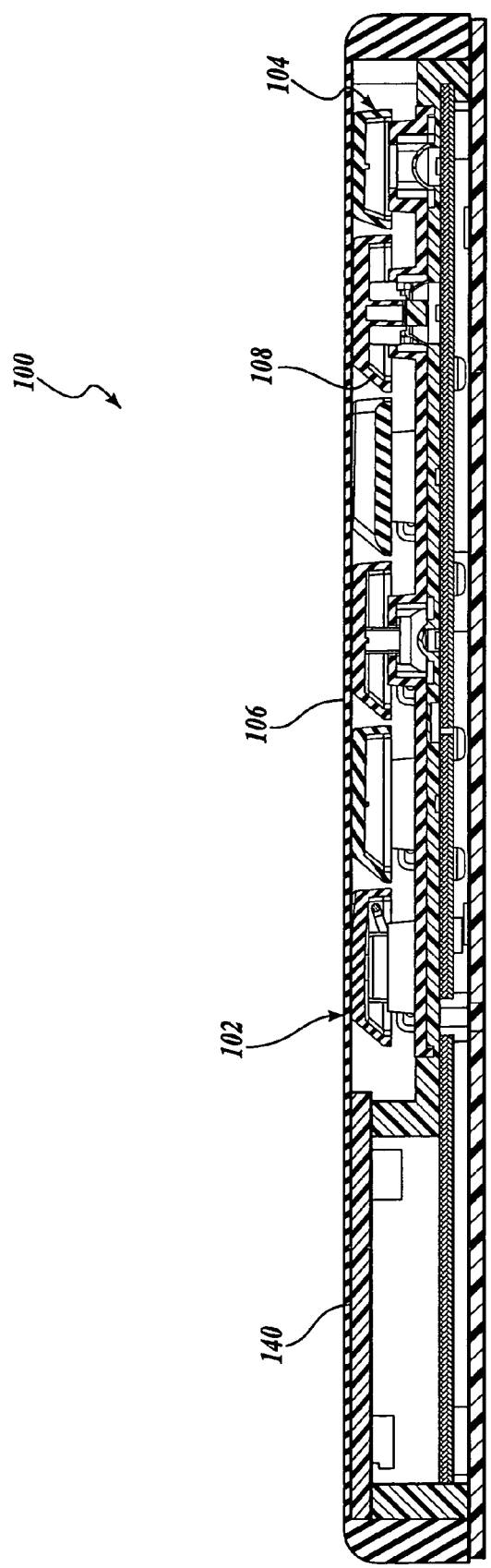
FIG. 3 is a cross-sectional view of the keyboard assembly of FIG. 2, the cross-sectional cut taken substantially through Section 3-3 of FIG. 2.

In light of the above description of the components of the keyboard assembly 100, the operation of the keyboard assembly 100 will now be described. Referring to FIG. 1, the cover 102 is removably coupled to the keyboard 104 such that the cover 102 completely covers or encases the underlying keyboard 104, including the key assemblies 108. Referring to FIG. 2, a user views the underlying key assemblies 108 through the translucent cover 102, and places his or her fingers in a typing position, aided by indicia 138 disposed on the cover 102. Alternatively, the user locates his or her fingers by printing on the cover 102, the printing being located in the vicinity of the corresponding keys. A user then performs touch-type typing.

Referring to FIG. 5, as the user's finger 146 contacts the cover 102 disposed above a key assembly 108 and presses downward with a force equaling or exceeding the actuation force of the key assembly 108 (which is preferably a low actuation force of about 0.3 lbf or less), the moveable key 110 underlying the cover 102 moves downward an amount equal to a medium-to-full travel length. As the moveable key 110 moves downward, the switch contact 118 associated with the moveable key 110 contacts the contact 122 associated with the switch layer 120, resulting in a desired switching effect and associated data entry.

The cover 102 is of sufficient flexibility such that when one key assembly 108 is fully actuated, adjacent key assemblies 108 are not inadvertently actuated. Further, the cover 102 is of sufficient flexibility such that the actuation force of the key assembly 108 is not appreciably increased by the force required to deflect the cover 102. Specifically, even with the cover 102 in place over the keyboard 104, the actuation force of the key assembly 108 is still a low actuation force for allowing a user to perform touch typing without significant fatigue.

Figure 7:
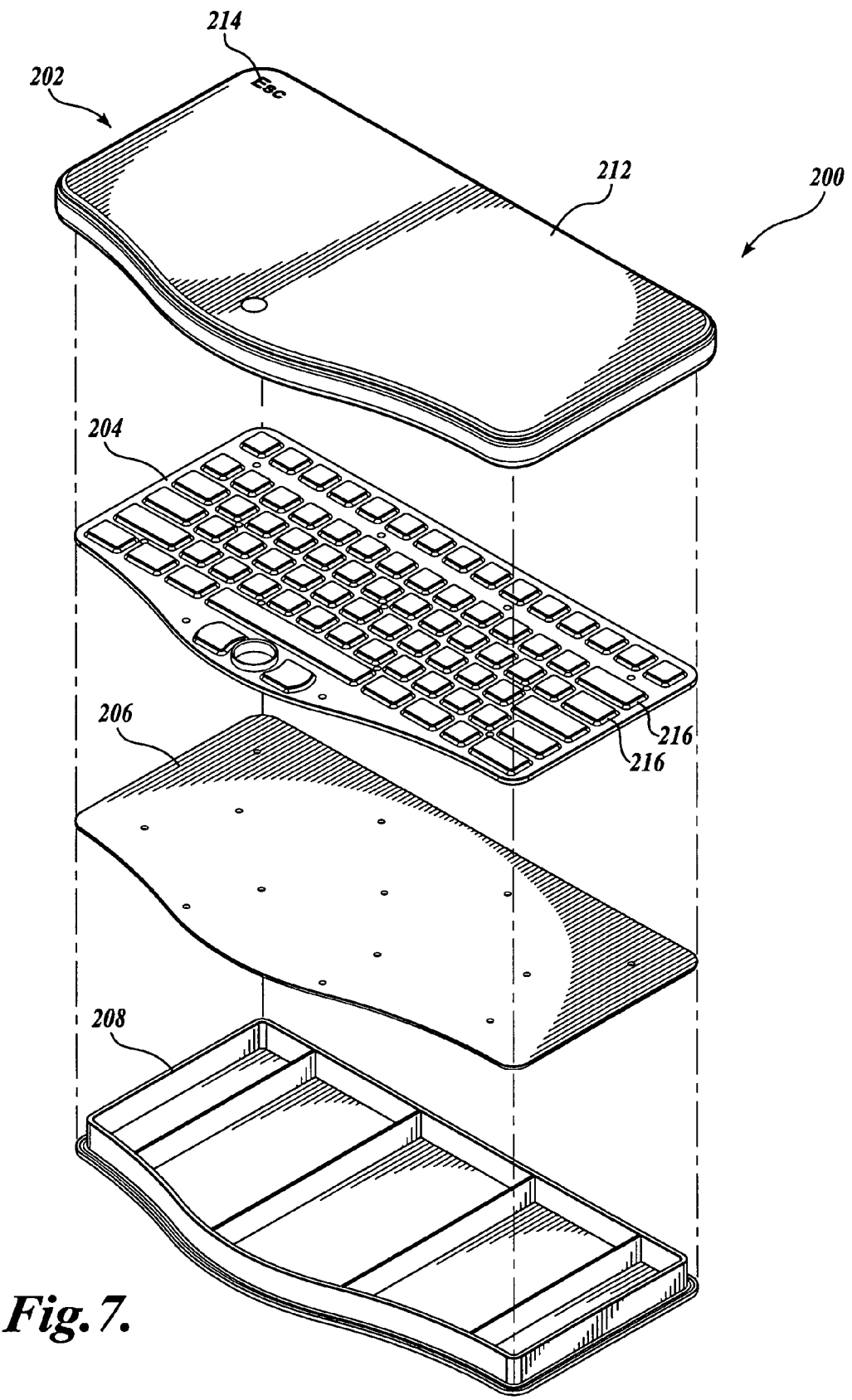
FIG. 7 is a partially exploded perspective view of a keyboard assembly formed in accordance with another embodiment of the presently claimed subject matter showing a keyboard cover removed from a keyboard, the keyboard having an actuation layer, a switch layer, and a base layer, wherein each layer is shown spaced from the others for clarity.
Figure 8:
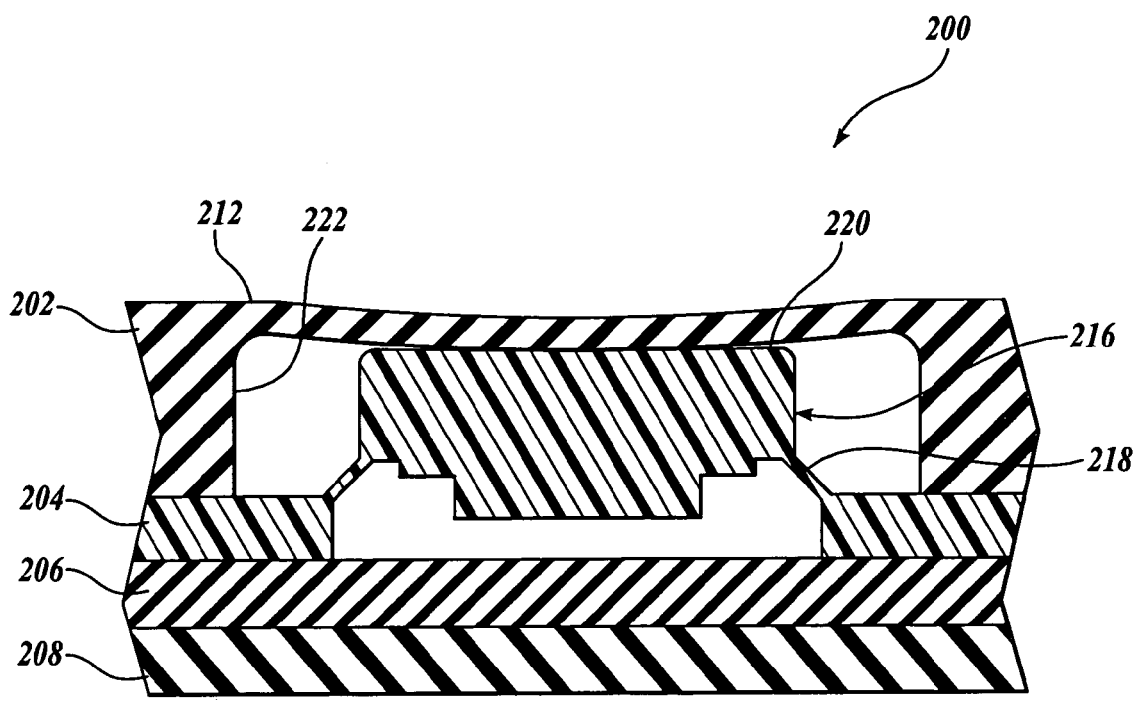
FIG. 8 is a partial cross-sectional view of a key assembly of the keyboard assembly of FIG. 7.

Referring to FIGS. 7 and 8, a keyboard assembly 200 constructed in accordance with another embodiment of the present disclosure is illustrated. The keyboard assembly 200 is substantially similar in structure and operation to the keyboard assembly 100 illustrated and described above in relation to FIGS. 1-6 with the following exceptions. The keyboard assembly 200 is an elastomer style version of the above described keyboard, and as such, is constructed without the moveable key 110, plunger 112, and key support structure 114 illustrated and described with regard to FIG. 4. Inasmuch as the two embodiments are substantially similar, for the sake of brevity, the following paragraphs focus generally on the aspects of the keyboard assembly 200 that deviate from the previously described embodiment.

The keyboard assembly 200 includes a cover 202 and a keyboard 204. The keyboard generally includes three layers, namely, from top to bottom, an actuation layer 210, a switch layer 206, and a base layer 208. The cover 202 and the three layers (210, 206, and 208) making up the keyboard 204 are substantially similar in construction and operation to the components of the above described embodiment bearing the same names, and therefore will not be described in detail.

The cover 202 wraps around the keyboard 204. A top surface 212 of the cover 202 is substantially flat and contains substantially no key-top features. Because the key-top features are substantially or entirely eliminated, the accumulation of contaminates on the keyboard assembly 200 are reduced. As a result, the keyboard assembly 200 can be easily cleaned.

The cover 202 suitably includes indicia 214 (see FIG. 7) indicating the function of the key, such as a letter of the alphabet that will be entered when the key is depressed, or a function, such as the letters "ESC" (signifying the "escape" function). The cover 202 may include support webs 222 (see FIG. 8) which extend downward from the top surface 212 of the cover 202 to engage the actuation layer 200 between adjacent key assemblies 216 to aid in the support and suspension of the cover 202 above the key assemblies 216.

The key assemblies 216 are generally of a low actuation force, medium-to-full travel variety. Each key assembly 216 includes a biasing member in the form of a depressible dome 218 which normally biases a contact pad 220 in an upward, non-contact, raised position, as shown in FIG. 8.

When the user presses downward on the cover 202 above the contact pad 220, the depressible dome 218 exerts an upward resistant force on the key assembly 216 that is being depressed. Thus, the user must overcome the upward resistant force to sufficiently depress the key assembly 216 to obtain switch closure and associated data entry. After the user releases his or her downward force on the key assembly 216, the upward force exerted by the depressible dome 218 returns the contact pad 220 to its raised position.

A keyboard assembly 300 constructed in accordance with another embodiment of the present disclosure may be best understood by referring to FIGS. 9-21. The keyboard assembly 300 is substantially similar in construction and operation to the keyboard assembly embodiment described with reference to FIGS. 1-8. Therefore, the following paragraphs generally focus only on aspects of the keyboard assembly 300 different from the embodiments described above.

The keyboard assembly 300 of FIGS. 9-19 the keyboard assembly 300 includes homing indicia 360 for helping a user to properly locate his or her fingers upon the keyboard assembly 300, a wraparound cover 302 for enhanced cleanability and aesthetics, and sensor assemblies 370 and 372 for detecting keyboard assembly 300 cleaning. The keyboard assembly 300 also includes a keyboard position adjustment assembly 380 (see FIG. 10); and a user interface system 450 (see FIG. 20) for managing the operation of the keyboard assembly 300.

Figure 9:
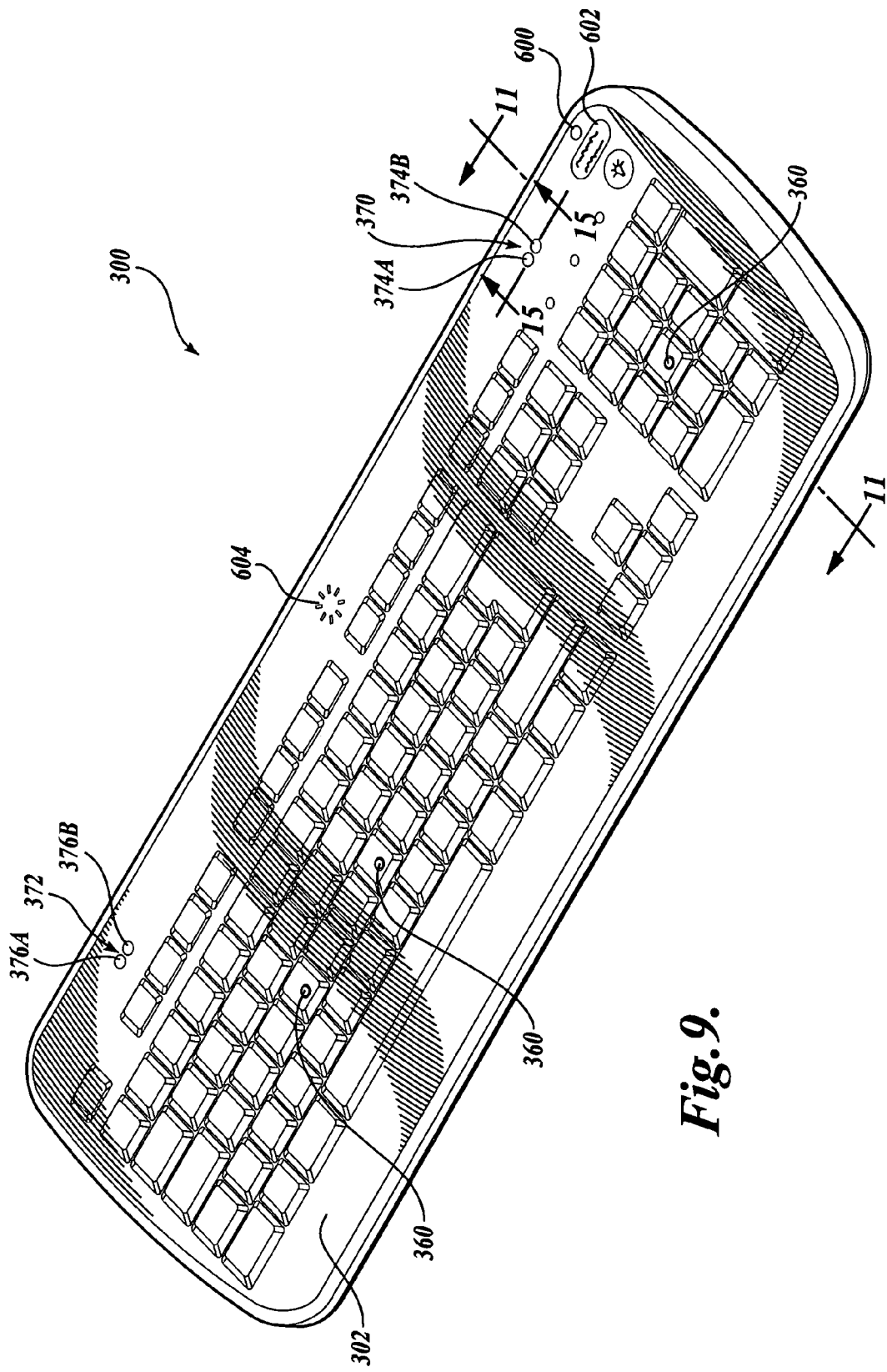
FIG. 9 is a perspective view of a top of an alternate embodiment of a keyboard assembly formed in accordance with the presently claimed subject matter.
Figure 12:
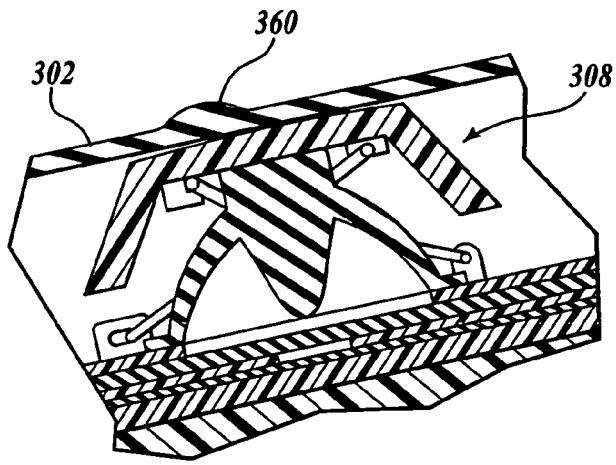
FIG. 12 is a partial cross-sectional view of a homing indicia of the keyboard assembly of FIG. 11.

Referring to FIGS. 9 and 12, homing indicia 360 are disposed on the cover 302 to indicate to a user a desirable hand or finger location on the keyboard assembly 300. The homing indicia 360 may be visual or physical in nature. As non-limiting examples, homing indicia 360 within the scope of the present disclosure includes text or images printed on the cover 302; an outline of an outer perimeter of the key assemblies 308 disposed below the homing indicia 360 on the cover 302; a change in the texture of the cover 302; slight indentation(s) on the cover 302; and/or raised structure(s) on the cover 302. As best seen in FIG. 12, the homing indicia 360 are in the form of convex bumps which are free of crevices and thus easily cleanable.

The homing indicia 360 of the illustrated embodiment may be disposed in one or more predetermined locations upon the cover 302 to aid a user in locating their hands/fingers in a preselected position upon the cover 302. In one embodiment, the homing indicia 360 are located on the cover 302 over the key assemblies 308 associated with selected reference keys, such as above the keys associated with characters "F" and "J" in a standard English keyboard and upon the "5" key of the numerical pad, to help a user properly locate their hands and fingers upon the keyboard assembly 300 in a standard position.

As discussed briefly above, the cover 302 may be of a wrap-around design. For example, referring to FIG. 11, the cover 302 wraps around a top surface 362 and side wall 364 of the keyboard 304, and couples to a bottom surface 366 of the keyboard 304. This "wrap-around" feature of the cover 302 may provide an aesthetically pleasing look to the keyboard assembly 300, as the ends of the cover 302 are substantially hidden from view. As configured, the ends of the cover 302 are located underneath the keyboard 304.

Further, because the cover 302 substantially covers, and preferably completely covers, the top surface 362 and the sides 364 of the keyboard 304, the top surface 362 and sides 364 are encased by an easily cleanable and substantially crevice-free material. Such encasement impedes the accumulation of dirt and infectious substances upon the keyboard 304, and provides a keyboard assembly 300 having both top 362 and side surfaces 364 that are easily cleanable.

Figure 13:
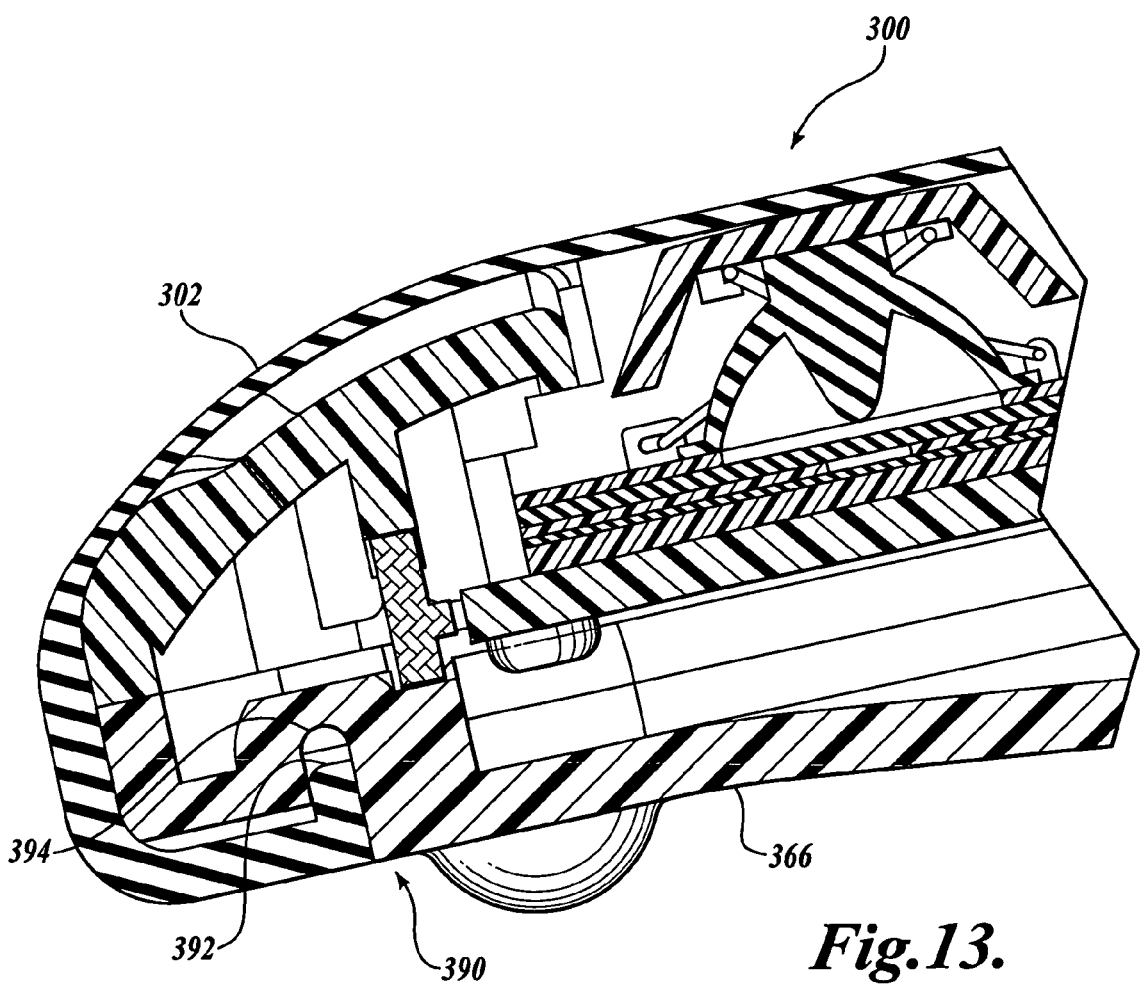
FIG. 13 is a partial cross-sectional view of a leading edge of the keyboard assembly of FIG. 11.
Figure 14:
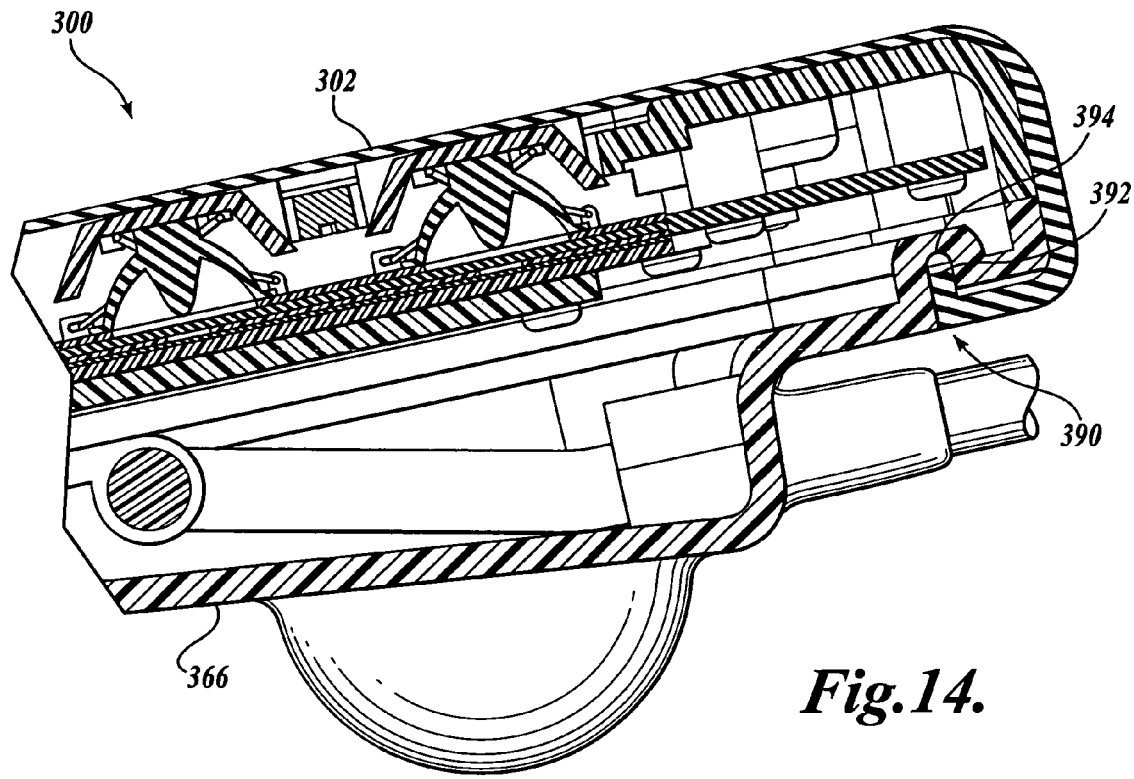
FIG. 14 is a partial cross-sectional view of a trailing edge of the keyboard assembly of FIG. 11.

Referring to FIGS. 13 and 14, the cover 302 of the illustrated embodiment is suitably coupled to the keyboard 304 by a coupling assembly 390. In the illustrated embodiment, the coupling assembly 390 includes a tongue 392 and groove 394 arrangement. More specifically, the ends of the cover 302 terminate in lips or tongues 392. The tongues 392 are sized and shaped to be cooperatively received within grooves 394 disposed slightly inward of an outer perimeter of the bottom surface 366 of the keyboard 304.

The cover 302 couples to the bottom surface 366 of the keyboard 304 such that the outer surface of the cover 302 and the bottom surface 366 are substantially coplanar. Such coplanar configuration provides an easily cleanable surface as it does not include any substantial crevices, abrupt changes in height or contour, or protrusions formed at the interface between the cover 302 and the bottom surface 366 of the keyboard 302.

In one embodiment, the tongue 392 is sized and shaped to sealingly engage the groove 394 to impede fluid ingress at the interface cover 302 and bottom surface 366. Although a specific coupling assembly 390 is illustrated and described, it is noted to those skilled in the art that other coupling assemblies 390 are suitable for use with and are within the spirit and scope of the presently claimed subject matter. As non-limiting examples, the cover 302 may be retained by many other coupling assemblies, such as fasteners, a few suitable examples being snaps, hook and loop fasteners, adhesives, clamps, etc.

Further, although a specific coupling assembly 390 is illustrated and described for coupling the cover 302 to the keyboard 304, it should be noted that the coupling assembly 390 is optional and may be eliminated. For example, the cover 302 may be sized and configured to be stretched over the keyboard 304, with the resiliency and elasticity of the cover 302 retaining the cover 302 to the keyboard 304 after the stretching force is removed. Additionally, although the cover 302 of the presently claimed subject matter is illustrated as only covering a portion of the bottom surface 366 of the keyboard 304, it should be appreciated by those skilled in the art that the cover 302 may alternately completely or substantially encompass the keyboard 304.

Referring to FIG. 9, the sensor assemblies 370 and 372 will now be described in greater detail. The sensor assemblies 370 and 372 are adapted to detect or sense user input. As a non-limiting example, a user input may be a cleaning of the keyboard assembly 300 with a cleaning fluid, such as water or alcohol. Inasmuch as the first and second sensor assemblies 370 and 372 are identical in construction and operation, only the first assembly 370 will be described for the sake of brevity.

Figure 15A:
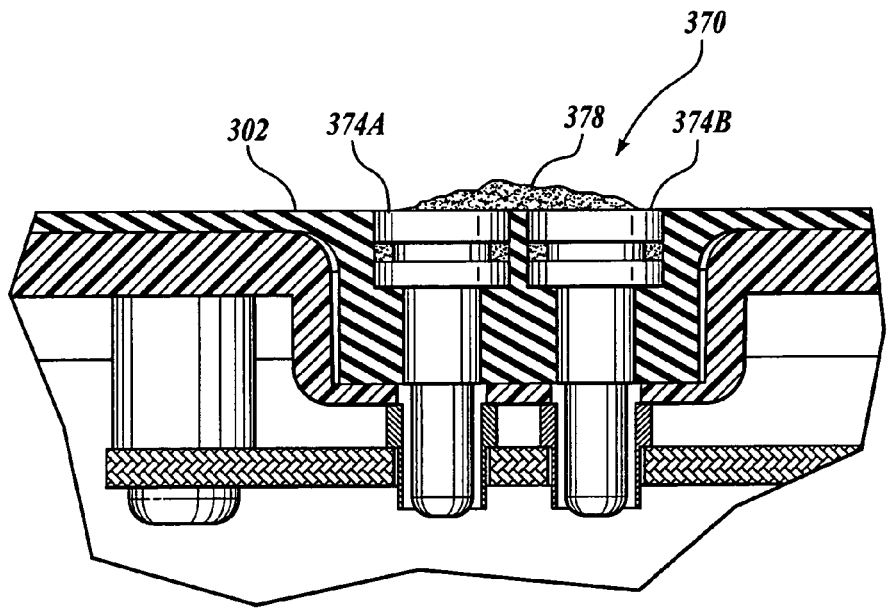
FIG. 15A is a partial cross-sectional view of a portion of a sensor assembly of the keyboard assembly of FIG. 9.

Referring to FIGS. 9 and 15A, the first sensor assembly 370 is a suitable conductive sensor assembly, including a first electrode or element 374a and a second electrode or element 374b. As the user wipes or applies a cleaning fluid 378 (optionally, with a cloth or towel) to the cover 302 during cleaning, the fluid 378 forms an electrical bridge between the first and second electrodes 374a and 374b. As a result, the electrodes 374a and 374b become electrically connected with one another, and the resistance between electrodes 374a and 374b is reduced.

After the cleaning fluid 378 has sufficiently bridged electrodes 374a and 374b together (i.e., the resistance between electrodes 374a and 374b has been reduced to a predetermined amount by the cleaning fluid 378), the first sensor assembly 370 sends a signal to a controller 454 (FIG. 20) indicating that the first sensor assembly 370 has detected the presence or application of a cleaning fluid 378 to the keyboard assembly 300. The controller 454 includes a well-known sensor controller (not shown) and a keyboard controller (not shown). Likewise, as the cleaning fluid 378 is applied to the keyboard assembly 300, first and second electrodes 376a and 376b of the second sensor assembly 372 become electrically connected with one another.

After the cleaning fluid 378 has sufficiently bridged electrodes 376a and 376b together, the second sensor assembly 372 sends a signal to the sensor controller 454 indicating that the second sensor assembly 372 has detected the presence of a cleaning fluid 378. Although two sensor assemblies 370 and 372 are described in the illustrated embodiment, it should be appreciated that more or less than two sensor assemblies are within the scope of the present disclosure.

One sensor controller suitable for use in the present embodiment is manufactured and sold by Cypress Semiconductor Corporation of 198 Champion Ct., San Jose, Calif. 95134 under the model number CY8C21534-24PVXI. One keyboard controller suitable for use in the present embodiment is manufactured and sold by Cypress Semiconductor Corporation of 198 Champion Ct., San Jose, Calif. 95134 under the model number CY8C24794-24LFXI.

The controller 454 is suitably programmed to monitor the duration of time between receipt of the signals indicating the presence of a cleaning fluid from each of the sensor assemblies 370 and 372. If the duration of time is within a certain range of time, then the controller 454 will acknowledge an input, e.g., a "successful cleaning" of the keyboard assembly 300. In another embodiment, the controller 454 may be programmed such that all sensor assemblies 370 and 372 must send their signals indicating the presence of a cleaning fluid 378 within a predetermined amount of time of each other before an input, e.g., a "successful cleaning" of the keyboard assembly 300, is acknowledged by the controller 454.

The sensor assemblies 370 and 372 are configured to be in communication with a warning assembly 456, as described in greater detail below. In such a configuration, after an input (e.g., a "successful cleaning" of the keyboard assembly 300) has been acknowledged by the sensor controller 454, a predetermined condition used to determine the state of the warning assembly 456, such as a predetermined interval, is reset to the beginning of the interval (such as "zero").

As a non-limiting example, the predetermined condition or interval may be a predetermined time period. In such a case, the predetermined time interval (monitored by, for example, a timer) is reset to time equal to zero. If this predetermined time interval passes before a new successful cleaning of the keyboard assembly 300 is acknowledged by the sensor controller 454, then the user will be notified by a warning signal issued by a warning assembly 456.

Thus, the warning assembly is at least partially operatively coupled to the keyboard assembly, and includes at least a first state and a second state. The first state of the warning assembly 456 indicates the expiration of a predetermined interval, such as a time interval. When in the first state, the warning assembly 456 provides a warning signal. Some non-limiting, but suitable examples of an warning signal include: a visual signal, such as a flashing light associated with the keyboard or a text message appearing on a display screen associated with the keyboard; an audible signal, such as a beep or voice message; a functional signal, such as locking of the keyboard such that the keyboard will not function until a successful cleaning has been logged; and/or a physical signal, such as the vibrating of the keyboard. The signal may be selectable changeable by the user. In one embodiment, a graphical user interface is operably connected to the keyboard assembly 300 to permit a user to selectively change the signal (see FIG. 21).

The second state of the warning assembly 456 indicates the duration of a predetermined interval, such as a time interval. When in the second state, the warning assembly 456 does not provide a warning signal and also indicates that a predetermined cleaning condition has been met.

Although the illustrated embodiment of the warning assembly 456 is described as indicating the passage of a predetermined time interval (i.e., a predetermined amount of time since a "successful cleaning"), it should be appreciated that any number of parameters could be used to set the predetermined cleaning interval. Such parameters include a predetermined number of keystrokes, after the computer is powered off or on a predetermined number of times, login by a new user, or any other interval for determining or monitoring usage of the key board. Each of the foregoing may also be referred to as "warning trigger sources," as described below with respect to FIGS. 22A and 22B.

The parameters of the predetermined interval are selectably changeably by the user. In one embodiment, a graphical user interface is operably connected to the keyboard assembly 300 to permit a user to selectively change the parameters of the predetermined interval (see FIG. 21).

Figure 15B:
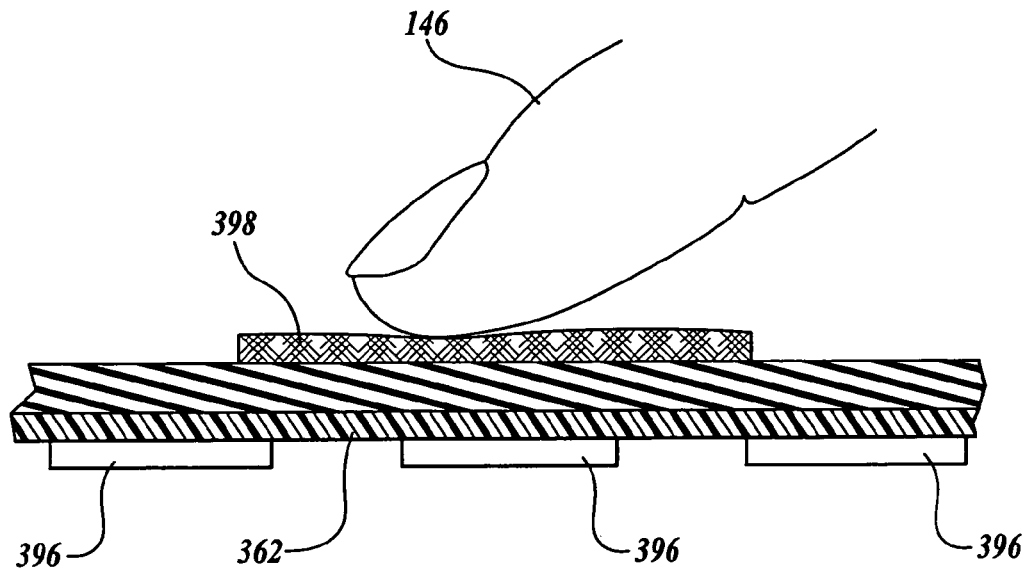
FIG. 15B is a partial cross-sectional view of a portion of an alternate sensor assembly of the keyboard assembly of FIG. 9.

Referring to FIG. 15B, an alternate embodiment is shown in which a single capacitance proximity sensor 396 is used in place of each sensor group 370. Capacitance proximity sensors 396 are well-known in the art and readily available. Therefore, for the sake of brevity, their function will not be described in detail herein.

In the illustrated embodiment, the capacitance proximity sensor 396 is disposed under the cover 302 and the top surface 362 of the keyboard 304, although it should be readily appreciated that other placements are also possible. In use, the capacity proximity sensors 396 detect a change in capacitance when an object is placed within its electric field. Different objects create different changes in capacitance, thereby allowing the capacitance proximity sensors 396 to differentiate between.

For example, the capacitance proximity sensor 396 can differentiate between the user's hand, the user's hand holding a dry cloth 398, and the user's hand holding a cloth 398 wetted with cleaning fluid 378. For that reason, as a non-limiting example, the capacitance proximity sensor 396 may be tuned so that the above conditions are distinguishable from each other.

Of note, although the illustrated embodiments are illustrated and described as having either a pair of sensor assemblies (whether of the conductive or capacitance type), it should be appreciated by those skilled in the art that any number of sensor assemblies in any number of locations may be used without departing from the spirit and scope of the presently claimed subject matter. Multiple sensors help ensure that the entire keyboard assembly is cleaned during cleaning, opposed to just one area of the keyboard assembly. Further, sensors may be substantially visually isolated within the keyboard assembly. In this regard, the sensors may be located inconspicuously within the keyboard assembly to help ensure that the user cleans the entire keyboard assembly rather than just around the known locations of the sensors.

It should also be noted that although specific sensor types are illustrated and described for use with the presently claimed subject matter, other types of sensors for detecting whether or not a successful cleaning evolution has occurred are within the present disclosure. As a non-limiting example, another type of sensor is actuation of a "cleaning complete" switch on the keyboard by a user after they have cleaned the keyboard. Another non-limiting example, another type of sensor is an optical liquid sensor able to detect the presence of a certain chemical or component of a cleaning fluid.

As may be best understood by referring back to FIG. 9, the keyboard assembly 300 may also include a clean mode system (lock-out assembly) to minimize the risk of inadvertent keyboard activation during cleaning. The clean mode system includes an activation button 600, a status light 602, and a warning light 604. The activation button 600 is a standard on/off switch coupled to the keyboard.

When cleaning of the keyboard is desired or required, the operator presses the activation button 600. This action will turn on the status light 602 to indicate to the operator that the keyboard is in a "CLEAN-MODE." Pressing the activation button 600 simultaneously deactivates the keyboard, such that in the event that keys are inadvertently pressed during cleaning, no data is sent to the host. This allows the operator to safely clean the keyboard.

After the keyboard is cleaned, the operator again presses the activation button 600. This causes the status light 602 to turn off, thereby indicating that the keyboard is no longer in CLEAN-MODE. The keyboard is simultaneously reactivated so that data can again be sent to the host.

If the keyboard is in CLEAN-MODE and a period of time elapses without the operator pressing the activation button 600, the CLEAN MODE will be automatically turned-off. As such, the status light 602 is turned-off and the keyboard is reactivated. A typical period of time for this automatic reactivation could be about 15-120 seconds, with 30 seconds being preferred. The actual period of time can be set by a systems administrator and according to use.

Still referring to FIG. 9, operation of the clean mode system will now be described in greater detail. In a typical protocol of operation, the warning light 604 will start to flash to indicated that cleaning is required. This functions as a signal to notify an operator that cleaning is required. The operator must then put the keyboard into clean mode by pressing the activation button 600 so that the keyboard can be safely cleaned. This, in turn, causes the status light 602 to be activated. Proper cleaning of the keyboard by a wipe-down protocol will cause the warning light 604 to go off. The operator will then press the activation button 600 a second time to reactivate the keyboard.

Although the use of the warning light 604 is preferred, other embodiments are within the scope of the present disclosure. As a non-limiting example, the clean mode system can be put into CLEAN-MODE without the warning light 604 being activated. Therefore, such embodiments are within the scope of the present disclosure.

Figure 10:
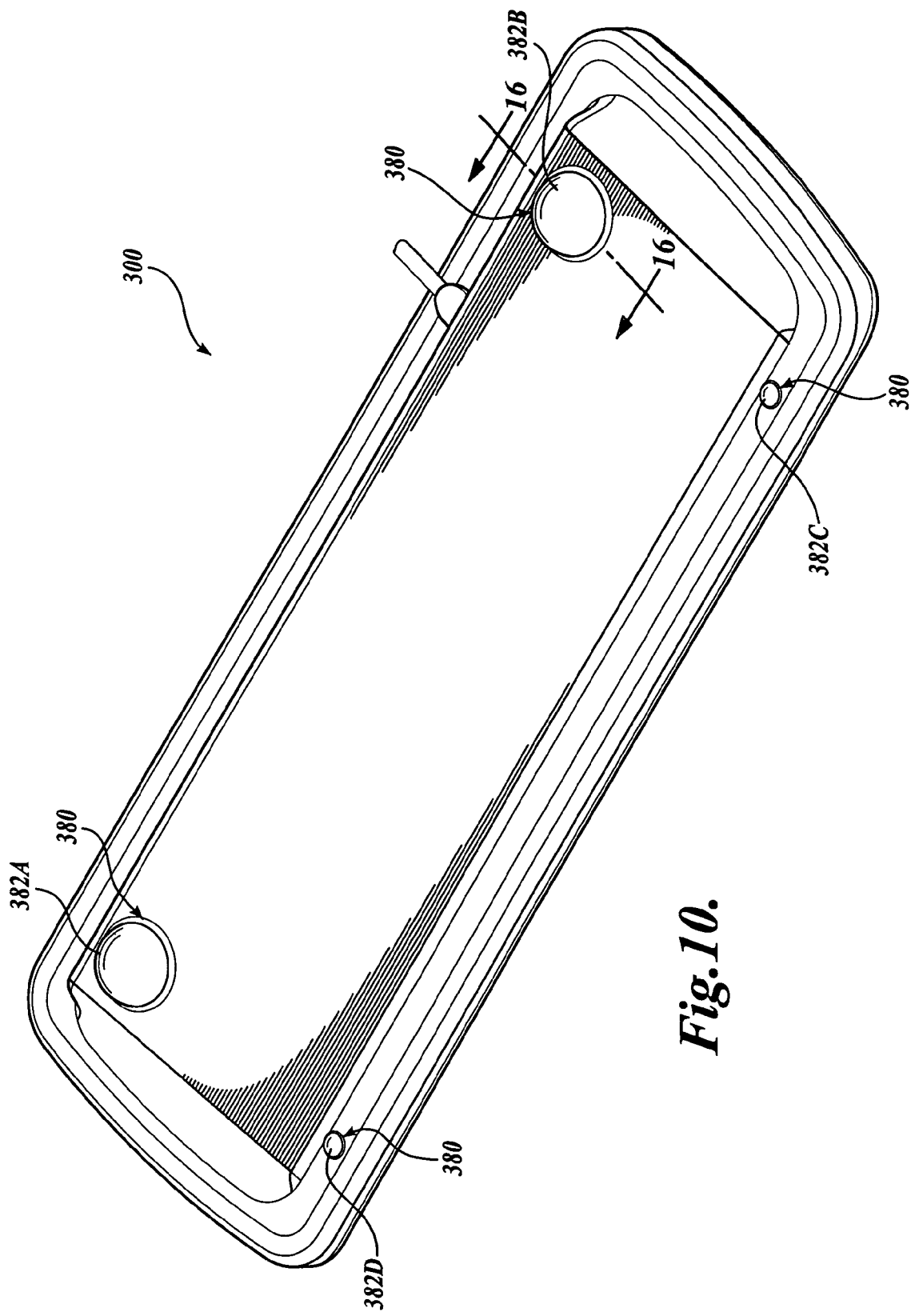
FIG. 10 is a perspective view of a bottom of the keyboard assembly of FIG. 9.
Figure 11:
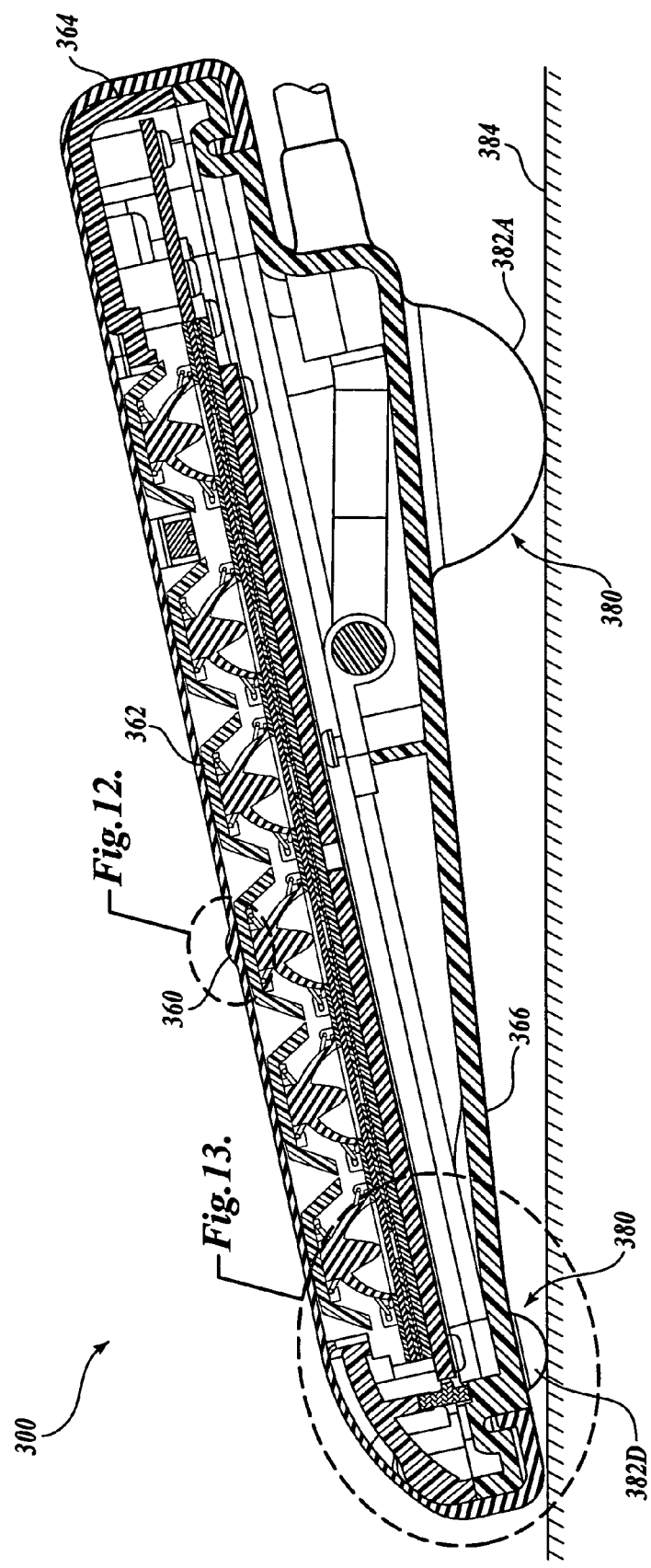
FIG. 11 is a cross-sectional view of the keyboard assembly of FIG. 9, the cross-sectional cut taken substantially through Section 11-11 of FIG. 9.

Referring now to FIGS. 10 and 11, the keyboard position adjustment assembly 380 of the keyboard assembly 300 will now be described in greater detail. The keyboard position adjustment assembly 380 permits an inclination and/or height of the keyboard assembly 300 relative to a support surface 384 to be adjusted, thereby allowing a user to select a proper ergonomic position for the keyboard assembly 300 during use.

The keyboard position adjustment assembly 380 includes one or more supports 382a, 382b, 382c, and 382d. The supports 382 are adapted to rest upon the support surface 384 and support the keyboard at a selected height and inclination above the support surface 384. One or more of the supports 382 may be adjustable in height such that a user may selectively adjust the height and/or inclination of the keyboard.

Figure 16:
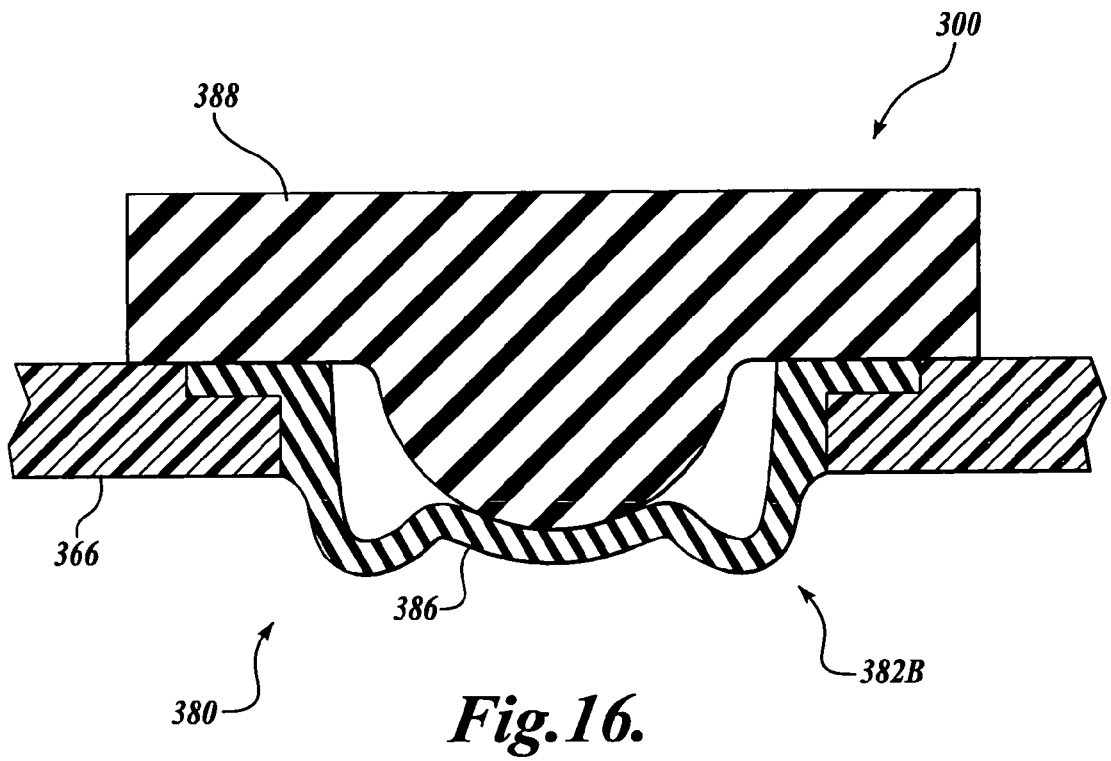
FIG. 16 is a cross-sectional view of a keyboard position adjustment assembly of the keyboard assembly of FIG. 10, the cross-sectional cut taken substantially through Section 16-16 of FIG. 10, the keyboard position adjustment assembly shown in a retracted position.
Figure 17:
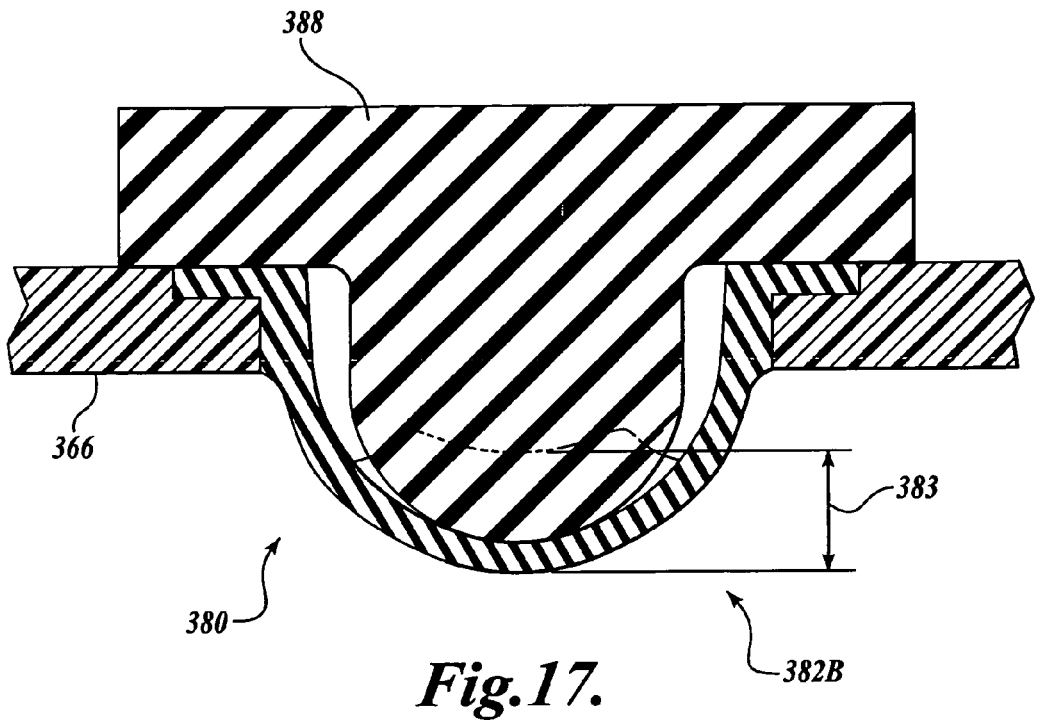
FIG. 17 is a view of the keyboard position adjustment assembly of FIG. 16, the keyboard position adjustment assembly shown in an extended position.

Turning to FIGS. 16 and 17, the right rear support 382b is shown. The right rear support 382b includes a cover 386 and a height adjustment mechanism 388. The cover 386 may be coupled to the bottom surface or enclosure 366 of the keyboard assembly 300 and at least partially house the adjustment mechanism 388 therein. The cover 386 is preferably coupled to the bottom enclosure in manner that does not result in the formation of crevices, such that the cover 386 provides an easily cleanable surface. Moreover, the cover 386 is coupled to the bottom enclosure 366 such that the transition between the cover 386 and the bottom enclosure 366 is substantially free of abrupt changes in contour, height, angle, etc., such that the outer surface of the cover 386 provides a smooth transition to the outer surface of the bottom enclosure 366.

The adjustment mechanism 388 may be a push button style adjustment mechanism, such that pressing the adjustment mechanism 388 causes the adjustment mechanism 388 to toggle between two or more positions, such as a retracted position as shown in FIG. 16 and an extended position as shown in FIG. 17. For instance, pressing on the adjustment mechanism 388 causes the adjustment mechanism to toggle from the retracted position to the extended position. Pressing the adjustment mechanism again causes the adjustment mechanism 388 to toggle back to the retracted position.

The adjustment mechanisms 388 associated with the rear supports 382a and 382b travel between the retracted and extended positions approximately between about 0.2 inches and 1 inch, with a preferred travel distance 383 of about 0.6 inches. However, it should be noted that other travel distances, either more or less than the distances recited herein, are suitable for use with and within the spirit and scope of the presently claimed subject matter.

The pressing force used to actuate the adjustment mechanism 388 between the retracted and extended positions is preferably large enough to prevent inadvertent closing by pressing on the keyboard assembly 300. A locking mechanism (not shown) may also be used to lock the adjustment mechanism 388 in a selected position to impede inadvertent actuation or change in height. Although the adjustment mechanism 388 is illustrated and described as a push button style adjustment mechanism, those skilled in the art will appreciate that the adjustment mechanism may take any suitable form that permits the support 382B to be adjusted in length, without departing from the spirit and scope of the presently claimed subject matter.

Any combination of adjustable and non-adjustable supports may be used. For instance, in one embodiment, only the rear supports 382a and 382b are adjustable in height. In another embodiment, all four supports 382a, 382b, 382c, and 382d are adjustable in height. In yet another embodiment, only the front supports 382c and 382d are adjustable in height. In still yet another embodiment, none of the supports are adjustable in height. Although the illustrated embodiment is illustrated and described as having four supports, it should be noted that any number of supports are suitable for use with and are within the spirit and scope of the presently claimed subject matter, including one, two, three, four, or five or more. Also, the supports may be eliminated all together.

Figure 18:
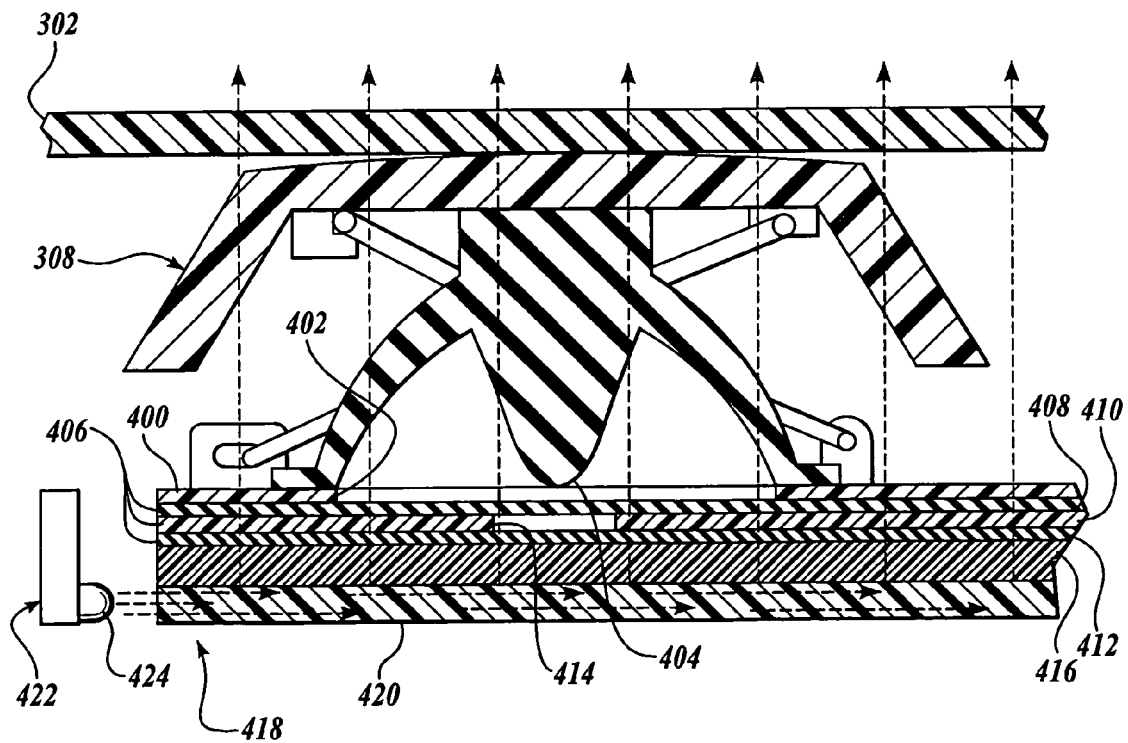
FIG. 18 is a cross-sectional view of a key assembly suitable for use with the above described embodiments.

Referring to FIG. 18, the components forming the keyboard assembly 300 will be described in greater detail on a layer by layer basis. The top layer of the keyboard assembly 300 is the cover 302. As discussed in detail above, the cover 302 may be a flexible, easily cleanable, translucent material, which is substantially free of crevices.

The key assemblies 308 are disposed directly below the cover 302. The key assemblies 308 of the illustrated embodiment of FIG. 18 are of a well-known scissor type key assembly arrangement, although any well-known or to be developed key assembly may be used without departing from the spirit and scope of the presently claimed subject matter.

As discussed in detail above, the key assemblies 308 are preferably medium-to-full travel key assemblies requiring low actuation forces to permit a user to use the keyboard assembly in a touch-type manner. Each key assembly 308 may be formed from transparent or translucent materials or is at least substantially formed from transparent or translucent material to permit a high percentage of light striking the key assembly to pass therethrough.

A key assembly support layer 400 may be disposed below the key assemblies 308. The key assembly support layer 400 may be used to provide a rigid or semi-rigid frame or base for supporting the key assemblies 308 during operation and to provide a substrate for mounting the key assemblies 308 thereto. The key assembly support layer 400 includes a plurality of apertures 402, the apertures 402 selectively located to be disposed below the key assemblies 308. The apertures 402 are sized and located to permit the energy director 404 to pass through the aperture 402 when a user depresses the key assembly 308 during typing such that the energy director 404 contacts a circuit board 406 disposed below the key assembly support layer 400.

The circuit board 406 of the illustrated embodiment includes three layers: a top contact layer 408, a spacer layer 410, and a bottom contact layer 412. The top contact layer 408 may be a flexible layer having a plurality of contacts (not shown) printed on the bottom surface of the top contact layer 408. The bottom contact layer 412 may be a rigid or flexible layer having a plurality of contacts (not shown) printed on the top surface of the bottom contact layer 412.

The spacer layer 410 is sandwiched between the top and bottom contact layers 408 and 412, thereby separating the top contact layer 408 from the bottom contact layer 412 under normal conditions. The spacer layer 410 includes a plurality of apertures 414. The apertures 414 are selectively sized and located as to be disposed below the energy director 404 of the key assemblies 308.

As the energy director 404 is actuated downward, the top contact layer 408 is deformed downward through one of the apertures 414 in the spacer layer 410 such that a contact disposed on the bottom surface of the top contact layer 408 is pressed into electrical communication with a contact disposed on a top surface of the bottom contact layer 412, thereby completing a circuit.

Completion of the circuit may result in a signal being sent to a computer or other device attached to the keyboard, instructing the computer or device to take a specific action. The circuit board 406 is preferably transparent or translucent to permit a substantial portion of the light hitting at least the bottom surface of the circuit board 406 to pass through the circuit board 406.

Disposed below the circuit board 406 may be a backer layer 416. The backer layer 416 may be a rigid or semi-rigid layer and may be used to increase the rigidity of the keyboard assembly 300. The backer layer 416 may be transparent or translucent to permit a substantial portion of the light hitting at least the bottom surface of the backer layer 416 to pass through the backer layer 416.

A light guide assembly 418 may be disposed below the backer layer 416 and may be used to back-light the cover 302. More specifically, the light guide assembly 418 includes a light guide 420 and a light emission assembly 422. Generally stated, the light emission assembly 422 directs light into the light guide 420, which redirects the light upward toward the cover 302. The light guide 420 is preferably able to redirect the light to the top surface of the cover 302 so as to illuminate substantially the entire top surface of the cover 302.

As a result of the transparent/translucent nature of the components disposed above the light guide 420, the light guide assembly 418 is preferably able to light substantially all of the top surface of the cover 302, although other percentages of illumination of the cover 302 are within the spirit and scope of the presently claimed subject matter, such as percentages greater than about 10%, 20%, 30%, 40%, 50%, 60%, 70%, 80%, or 90%.

Figure 19:
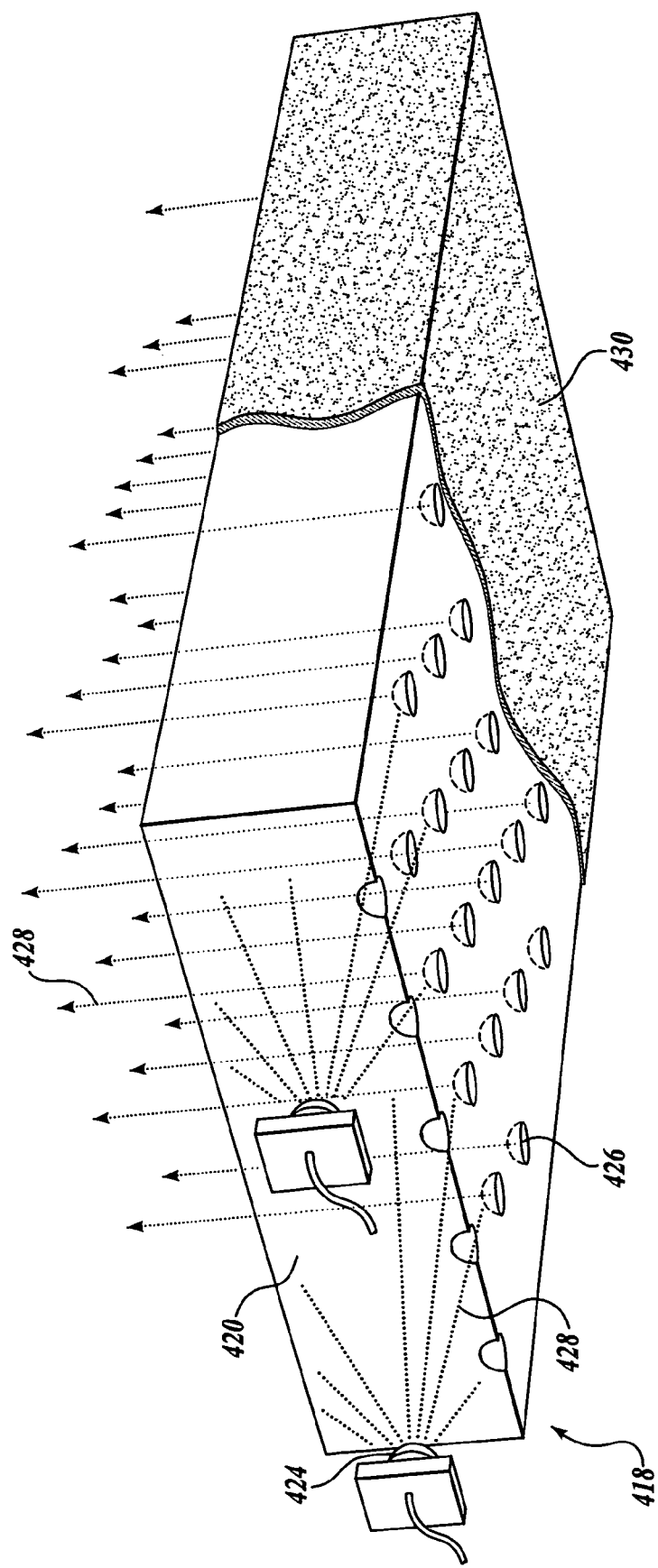
FIG. 19 is an perspective view of a light guide assembly suitable for use with the key assembly of FIG. 18.

Referring to FIG. 19, the light guide assembly 418 of FIG. 18 will be described in further detail. The light guide assembly 418 includes one or more light emitters 424 and the light guide 420. The light emitters 424 may be any suitable light generating source, a few examples being LEDs as illustrated, incandescent lights, etc. The light guide 420 may be made of any transparent or translucent material able to transmit light, a few suitable examples being acrylic and polycarbonate materials.

The light guide 420 may include one or more light redirectors 426. The light redirectors 426 are positioned and shaped to redirect light emitted from the light emitters 424 toward a top surface of the light guide 420 so as to be directed toward a top surface of the keyboard. In the illustrated embodiment, the light emitters 424 emit light in a horizontal direction. After the emitted light 428 hits the light redirectors 426, the light redirectors 426 redirect the light from anywhere between 0 to 180 degrees, and preferably 90 degrees, from the original path of the emitted light, such that the emitted light is directed toward the top surface of the keyboard.

In the illustrated embodiment, the light redirectors 426 are in the form of hemispherically-shaped recesses located in an array on the bottom surface of the light guide 420. Although a specific shape of the light redirectors 426 is illustrated and described, it should be appreciated by those skilled in the art that alternately shaped light redirector geometries 426 are suitable for use with and are within the spirit and scope of the presently claimed subject matter.

The light guide 420 may also include a series of light reflectors 430 disposed about the outer surface of the light guide 420. The light reflectors 430 increase the efficiency of the light guide 420 by impeding the emitted light 428 from passing out of the light guide 420 except through a predetermined area, one suitable example being the top surface of the light guide 420.

In the illustrated embodiment, the light reflectors 430 are formed from reflective material attached to the sides (except the side in which the light emitters 424 direct the emitted light toward to enter the light guide) and the bottom surface of the light guide 420. The reflective material includes a reflective surface which reflects any emitted light hitting the reflective surface back into the light guide 420 for redirection toward the top surface of the light guide 420. A diffusing film may also be employed on the top surface.

Figure 20:
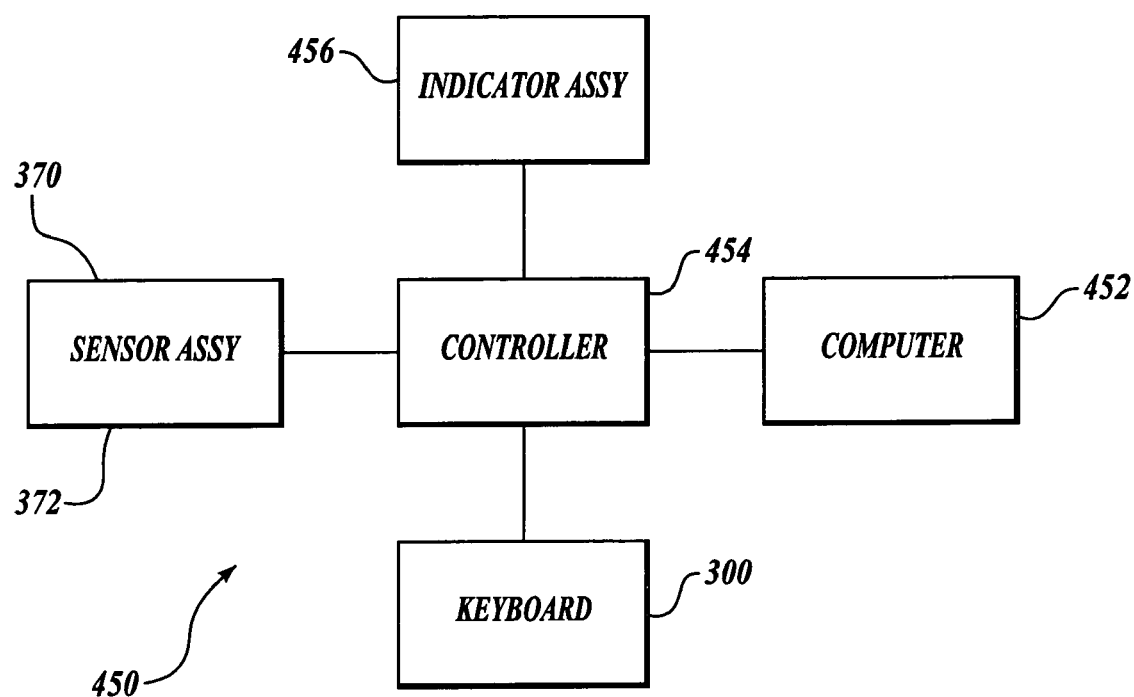
FIG. 20 is a block diagram of a user interface system for managing the operation of the keyboard and exchanging data with the user.

Turning to FIG. 20, a user interface system 450 for permitting data exchange with a user will be illustrated and described. The user interface system 450 places the above described keyboard assembly 300 and its associated subcomponents, such as the sensor assemblies 370 and 372 and the warning assembly 456, in communication with another. Further, the user interface system 450 places the keyboard assembly 300 and its associated subcomponents in communication with a computer 452.

The computer may be a well-known computer 452 adapted to send and/or receive data from the keyboard assembly 300, and therefore will not be described further herein for the sake of brevity. The controller 454 is adapted to send and/or receive signals from the keyboard assembly 300, its associated subcomponents, and/or a user, and control the operation of the keyboard assembly 300 and sensor assemblies 370 and 372 in accordance with the information received. For instance, a user may select and enter a predetermined threshold sensor value, i.e., the level at which the sensor assemblies will indicate detection of a cleaning fluid.

The user may select and enter a predetermined time value in which the first sensor assembly 370 detects a cleaning fluid, the second sensor assembly 372 must detect a cleaning fluid or a failed cleaning evolution will be indicated. The user may also select and enter predetermined times or events in which cleaning will be required, such as upon boot up of a computer associated with the keyboard, upon a change in users, a predetermined duration after a logged successful cleaning, a certain time of the day/week/month/year, etc.

The user may also select the manner in which data is sent to the user, i.e., via audio alarm, visual alarms and or messages, functional (locking out of keyboard), physical alarms (vibration), data reports, etc. The user may also select the parameters or format of the data sent to the user (a few suitable examples being the volume of audible alarms, the frequency and pattern of beeps, etc.), the characteristics of the visual alarms (a few suitable examples being selecting an image to be displayed, frequency and pattern of flashes of light, etc.)

The user may also select and enter if a message (and what message) should be sent to the computer for display to the user related to cleaning of the keyboard. A few suitable examples would be indicating that cleaning is required, that cleaning has been completed, when the next scheduled cleaning is to take place, instructions for cleaning, etc.

Figure 21:
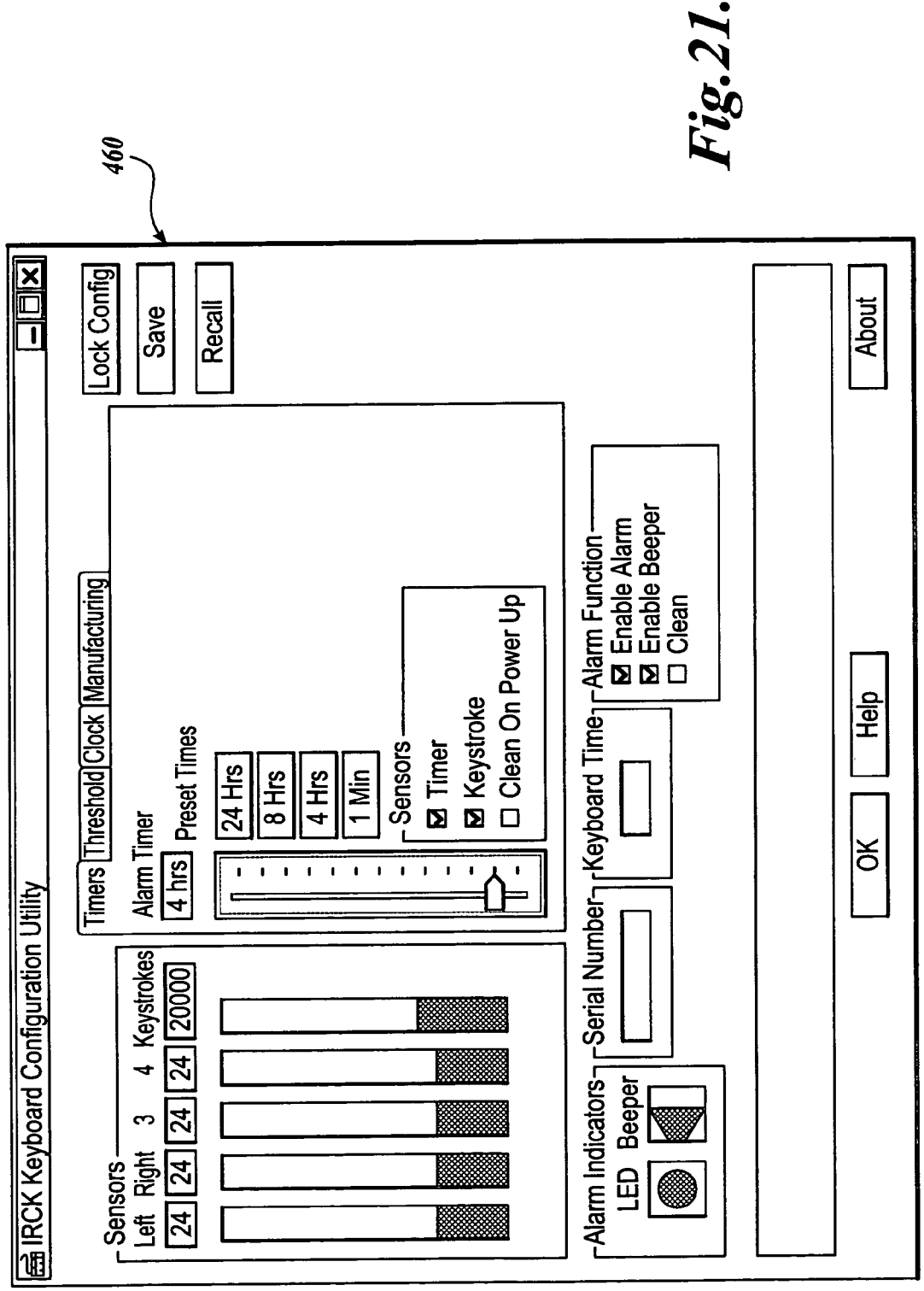
FIG. 21 is a graphical user interface for managing the operation of the keyboard and exchanging data with the user.

FIG. 21 illustrates one embodiment in which the user interface system 450 has a graphical user interface 460 through which the user can enter data to control the operation of the keyboard assembly 300. The illustrated graphical user interface 460 is a software program that can be installed on the computer, embedded in the keyboard hardware, or otherwise operably connected to the computer. Graphical user interfaces are well-known in the art and therefore will not be described further herein for the sake of brevity. It should be appreciated by those skilled in the art that a graphical user interface could be modified to allow a user to send and/or receive a wide variety of signals and data as dictated by the user's needs.

The operation of the controller 454 in controlling the sensor assemblies 370 and 372 will now be described. A predetermined threshold sensor value may be entered through the graphical user interface 460 via the keyboard assembly 300 or any other suitable means. The controller 454 then records the predetermined threshold sensor value.

After a signal is received from the sensor assembly 370 from one of the sensor groups indicating a potential sensing of a cleaning fluid, the controller 454 analyzes the signal received relative to the predetermined threshold sensor value to determine if the signal received exceeds the predetermined threshold sensor value. If the value of the signal received exceeds the predetermined threshold sensor value then a "cleaning fluid detected" or "sensor has been wiped" at the right sensor group is recorded.

If the value of the signal received does not reach the predetermined threshold sensor value, then a "failed cleaning fluid detection" is recorded. This process is repeated for the left sensor group. After a cleaning fluid detected signal is received by both the left and right sensor groups by the controller, the controller 454 compares the duration of time between receipt of the cleaning fluid detected signals. If this value is less than a predetermined time cycle value entered by the user, then a successful cleaning action is indicated by the controller via the warning assembly 456. If this value is more than the predetermined time cycle valve entered by the user, then a failed cleaning action is acknowledged by the controller 454 and no change in cleaning state or operation of the keyboard is initiated.

Although the controller 454 is depicted as a separate component from the keyboard assembly 300 in the illustrated embodiment, it should be noted that the controller 454 may be located in any suitable location. For instance, the controller 454 may be an integral component or group of components of the keyboard assembly 300, or may be a software program running on the computer.

Figure 22A:
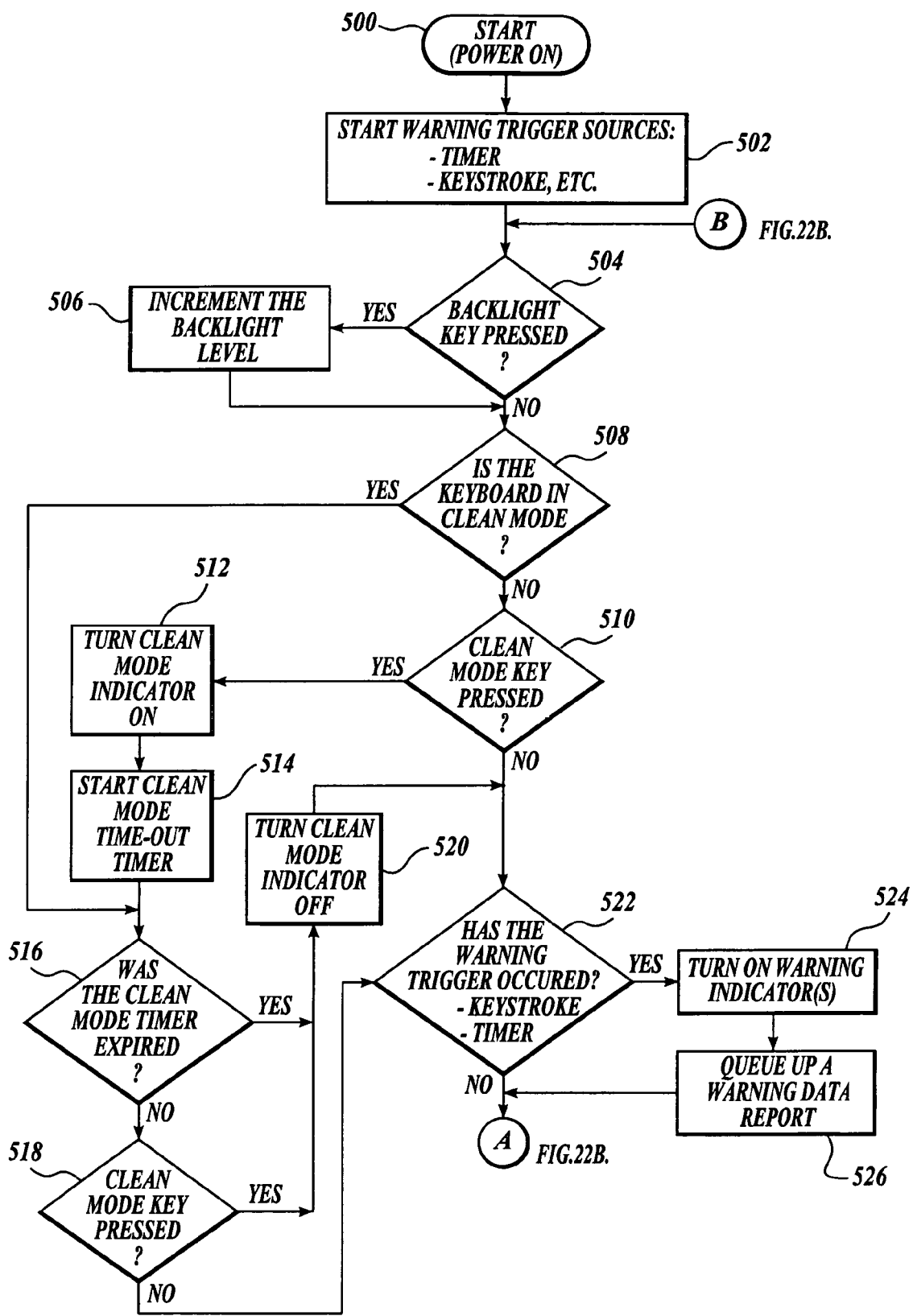
FIGS. 22A and 22B are functional flow diagrams indicating operation of the keyboard assembly of FIG. 9.
Figure 22B:
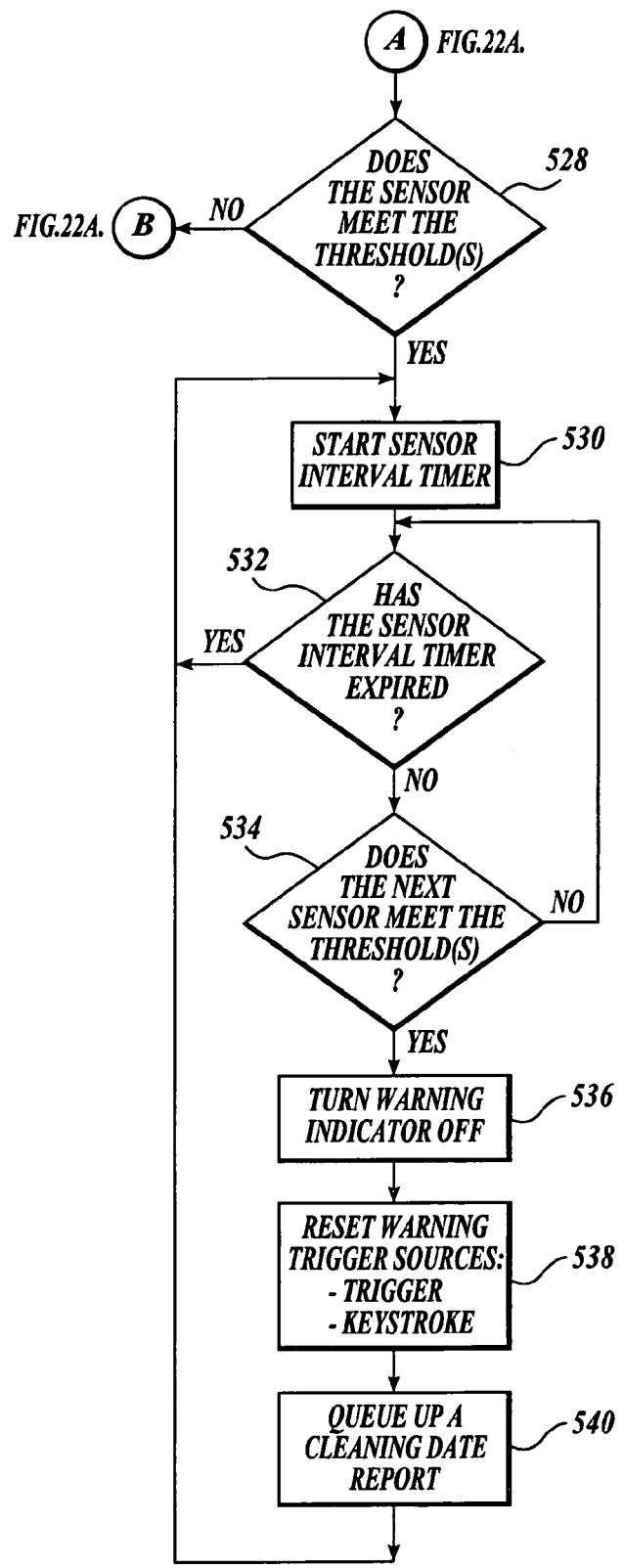

Operation of the key board assembly 300 is further understood by reference to FIGS. 22A and 22B. A user will power on the keyboard, indicated by the start block 500. This initiates the warning trigger sources described above and referred to by the block 502. The user may optionally turn on the back-lit key board feature, indicated by the decision block 504. If the user activates the back-lit key feature, the intensity of the lighting level may be adjusted, indicated by the block 506.

The keyboard is scanned to determine whether or not it is in the "clean mode," indicated by the decision block 508. If the keyboard is not in the "clean mode," the user may press the activation button 600 (FIG. 9) and indicated by the decision block 510. If the activation button 600 is pressed by the user, then the clean mode indicator light or status light 602 is activated and indicated by the block 512. This also starts the clean mode time out timer, designated by the block 514.

As described above, the clean mode system is operational for only a predetermined period of time and decision block 516 assess whether or not this time has expired. If the time has not expired, then the keyboard remains in the clean mode until the user represses the activation button 600, indicated by the block 518. If the user has pressed the activation button 600, then the clean mode indicator or status light 602 is turned off, indicated by the block 520.

The operational flow diagram continues to the decision block 522 to determine whether any one of the triggering events has occurred. If the triggering event has occurred, then the warning indicator, such as the warning light 604, is activated, as set forth in the block 524. Also, an optional data warning report may be trigger, indicated by the block 526.

Referring to FIG. 22B, if the trigger event has occurred and the warning for cleaning is activated, the sensors are monitored to determine whether or not they have been wiped, indicated by the decision block 528. If the sensor has been wiped, then the sensor interval timer, indicated by the block 530 is initiated. As set forth in the decision block 532, the interval is monitored to determine whether the interval period has expired. The timer may be set for any range of time, such as between one second up to three minutes or more, with a preferred range being about 20 seconds. As noted above, this represents the period of time in which (if the keyboard includes more than one sensor) all sensors must be wiped for a satisfactory cleaning.

If the timer has expired, then the sensor interval timer is reset, as indicated by the block 530. In the event that the sensor interval timer has not expired, the sensor is monitored to determine whether or not it meets the threshold condition (i.e., has been wiped), indicated by the block 534. If the second sensor has not been wiped, the sensor interval timer is reevaluated to determine whether or not the interval timer has expired.

It should be noted that this portion of the flow diagram is repeated for the number of sensors embedded in the keyboard. As a non-limiting example, if the keyboard assembly includes five sensors, then each sensor must be evaluated within the allotted time to determine whether all sensors have been wiped clean.

Still referring to FIG. 22B, if the sensor, indicated in block 534, meets the threshold, then the warning indicator is turned off, indicated by the block 536. The warning triggers are reset, indicated by the block 538, and finally a cleaning date report may be generated, indicated by the block 540.

While illustrative embodiments have been illustrated and described, it will be appreciated that various changes can be made therein without departing from the spirit and scope of the presently claimed subject matter.

The embodiments of the present subject matter in which an exclusive property or priviledge is claimed are defined as follows:

1. A keyboard assembly, comprising:
   (a) a keyboard having at least one input key assembly positioned within a housing; and
   (b) a warning assembly at least partially operatively coupled to the keyboard assembly, wherein the warning assembly includes at least a first state, indicating an expiration of a first interval, and a second state, indicating a predetermined cleaning condition has been met.

2. The keyboard assembly of claim 1, wherein the second state indicates a duration of a first interval.

3. The keyboard assembly of claim 1, wherein the first state includes providing a signal.

4. The keyboard of claim 3, wherein the signal is selected from the group consisting essentially of an audible signal, a visual signal, a data packet and a tactile signal.

5. The keyboard of claim 3, wherein the signal is selectively changeable.

6. The keyboard assembly of claim 5, wherein a graphical user interface is operably connected to the keyboard assembly to permit a user to selectively change the signal.

7. The keyboard assembly of claim 1, wherein the second state includes not providing a signal.

8. The keyboard assembly of claim 1, wherein the first interval is selected from the group consisting essentially of a number of keystrokes and a time period.

9. The keyboard assembly of claim 1, wherein the first interval is selectably changeable.

10. The keyboard assembly of claim 9, wherein a graphical user interface is operably connected to the keyboard assembly to permit a user to selectively change the first interval.

11. The keyboard assembly of claim 1, further comprising a lighting assembly disposed within the keyboard.

12. The keyboard assembly of claim 1, further comprising a lock-out assembly coupled to the keyboard to minimize risk of inadvertent key actuation during cleaning.

13. The keyboard assembly of claim 12, wherein the lock-out assembly is active for a predetermined period of time.

14. The keyboard assembly of claim 1, wherein the keyboard assembly further includes a cover sized and configured to substantially encase the keyboard.

15. The keyboard assembly of claim 14, wherein the cover includes a substantially flat top surface and a predetermined flexibility to substantially mechanically isolate one input key assembly from a second input key assembly during use.

16. The keyboard assembly of claim 15, wherein the cover is coupled to the keyboard by wrapping around sides of the keyboard.

17. A keyboard assembly, comprising:
   (a) a keyboard having at least one input key assembly positioned within a housing;
   (b) a warning assembly at least partially operatively coupled to the keyboard assembly, wherein the warning assembly includes at least a first state, indicating an expiration of a first interval, and a second state; and
   (c) a sensor assembly in communication with the warning assembly to cause the warning assembly to change from the first state to the second state when the sensor assembly senses an input.

18. The keyboard assembly of claim 17, wherein the second state indicates a duration of a first interval.

19. The keyboard assembly of claim 17, wherein the first state includes providing a signal.

20. The keyboard assembly of claim 17, wherein the second state includes not providing a signal.

21. The keyboard assembly of claim 20, wherein the duration of a first interval is reset when the sensor assembly senses the input.

22. The keyboard assembly of claim 17, wherein the sensor is at least partially disposed within the keyboard assembly to substantially visually isolate the sensor assembly.

23. The keyboard assembly of claim 17, wherein the input is an application of a cleaning fluid.

24. The keyboard assembly of claim 17, wherein the sensor assembly includes a conductive sensor.

25. The keyboard assembly of claim 17, wherein the sensor assembly includes a capacitance proximity sensor.

26. The keyboard assembly of claim 17, wherein the sensor assembly includes a plurality of sensors.

27. The keyboard assembly of claim 17, further comprising a lighting assembly disposed within the keyboard.

28. The keyboard assembly of claim 17, further comprising a lock-out assembly coupled to the keyboard to minimize risk of inadvertent key actuation during cleaning.

29. The keyboard assembly of claim 28, wherein the lock-out assembly is active for a predetermined period of time.

30. The keyboard assembly of claim 17, wherein the keyboard assembly further includes a cover sized and configured to substantially encase the keyboard.

31. The keyboard assembly of claim 30, wherein the cover includes a substantially flat top surface and a predetermined flexibility to substantially mechanically isolate one input key assembly from a second input key assembly during use.

32. The keyboard assembly of claim 31, wherein the cover is coupled to the keyboard by wrapping around sides of the keyboard.

33. The keyboard assembly of claim 32, wherein the input is applied to the cover.

* * * * *